United States Patent
Nam et al.

(10) Patent No.: US 10,651,995 B2
(45) Date of Patent: May 12, 2020

(54) TRANSMISSION OF GROUP COMMON CONTROL INFORMATION IN NEW RADIO

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US); Makesh Pravin John Wilson, San Diego, CA (US); Sumeeth Nagaraja, San Diego, CA (US); Xiao Feng Wang, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 16/133,582

(22) Filed: Sep. 17, 2018

(65) Prior Publication Data
US 2019/0089499 A1 Mar. 21, 2019

Related U.S. Application Data

(60) Provisional application No. 62/560,617, filed on Sep. 19, 2017.

(51) Int. Cl.
*H04L 5/00* (2006.01)
*H04W 4/06* (2009.01)
(Continued)

(52) U.S. Cl.
CPC ........... *H04L 5/005* (2013.01); *H04B 7/0408* (2013.01); *H04B 7/0617* (2013.01);
(Continued)

(58) Field of Classification Search
CPC ..... H04L 5/005; H04L 5/0048; H04L 5/0053; H04L 5/0069; H04L 5/0023;
(Continued)

(56) References Cited

U.S. PATENT DOCUMENTS

2016/0095003 A1 3/2016 Yu et al.
2019/0081673 A1* 3/2019 Athley ................ H04B 7/0617
(Continued)

OTHER PUBLICATIONS

Huawei et al., "Contents of Group-Common PDCCH", 3GPP Draft, R1-1709953, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 17, 2017 (Jun. 17, 2017), XP051304693, 4 Pages.
International Search Report and Written Opinion—PCT/US2018/051554—ISA/EPO—dated Dec. 20, 2018.
National Instruments: "Discussion on Robust Beam Management", 3GPP Draft, R1-1708271 Discussion on Robust Beam Management_Final, 3rd Generation Partnership Project (3GPP), Mobile Competence Centre, 650, Route Des Lucioles, F-06921 Sophia-Antipolis Cedex, Fran, vol. RAN WG1, No. Hangzhou, May 15, 2017-May 19, 2017, May 14, 2017 (May 14, 2017), XP051273464, pp. 1-4.
(Continued)

*Primary Examiner* — Melvin C Marcelo
(74) *Attorney, Agent, or Firm* — Loza & Loza, LLP

(57) ABSTRACT

Aspects of the present disclosure provide for the transmission of group common control information in 5G New Radio (NR) wireless communication systems. Group common control information may be transmitted to a group or subset of user equipment (UEs) within a cell utilizing a beam-sweeping configuration. A base station may utilize a plurality of transmit beams to transmit information within the cell, and a subset of the transmit beams may be identified for use in transmitting the group common control information to the group of UEs. In addition, the base station may identify spatial quasi-colocation (QCL) relationships between reference beams corresponding in direction to the selected subset of transmit beams and resources reserved for the group common control information and provide the spatial QCL relationships to the UEs in the group.

30 Claims, 16 Drawing Sheets

(51) Int. Cl.
  *H04W 72/04* (2009.01)
  *H04W 4/02* (2018.01)
  *H04B 7/06* (2006.01)
  *H04B 7/0408* (2017.01)

(52) U.S. Cl.
  CPC ......... *H04B 7/0695* (2013.01); *H04L 5/0048* (2013.01); *H04L 5/0053* (2013.01); *H04L 5/0069* (2013.01); *H04W 4/023* (2013.01); *H04W 4/06* (2013.01); *H04W 72/048* (2013.01); *H04W 72/0453* (2013.01); *H04L 5/0023* (2013.01)

(58) Field of Classification Search
  CPC ... H04B 7/0408; H04B 7/0617; H04W 4/023; H04W 4/06; H04W 72/0453; H04W 72/048
  See application file for complete search history.

(56) References Cited

U.S. PATENT DOCUMENTS

2019/0364556 A1\* 11/2019 Davydov ............. H04B 7/0695
2020/0008216 A1\* 1/2020 Iyer ................... H04W 72/1242

OTHER PUBLICATIONS

Samsung: "Downlink Beam Management in NR", 3GPP Draft, R2-1705732 Downlink Beam Management in NR, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051276033, 6 Pages.

Samsung: "Multibeam Transmission for PDCCH", 3GPP Draft, R1-1713614 Multibeam Transmission for PDCCH, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051316414, pp. 1-6.

Samsung: "On Beam Indication", 3GPP Draft, R1-1713595 DL_Beam_Indication_V1, 3rd Generation Partnership Project (3GPP), Mobile Competence Centre, 650, Route Des Lucioles, F-06921 Sophia Antipolis Cedex, France, vol. RAN WG1, No. Prague, Czechia, Aug. 21, 2017-Aug. 25, 2017, Aug. 20, 2017 (Aug. 20, 2017), XP051316395, 10 Pages.

\* cited by examiner

TRANSMISSION OF GROUP COMMON CONTROL INFORMATION IN NEW RADIO

PRIORITY CLAIM

This application claims priority to and the benefit of Provisional Patent Application No. 62/560,617 filed in the U.S. Patent and Trademark Office on Sep. 19, 2017, the entire contents of which are incorporated herein by reference as if fully set forth below in their entirety and for all applicable purposes.

TECHNICAL FIELD

The technology discussed below relates generally to wireless communication systems, and more particularly, to the transmission of group common control information. Embodiments can provide and enable techniques for selecting resources and beams for transmitting group common control information.

INTRODUCTION

In 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

Broadcast information, such as the master information block, system information blocks, and paging information, may be transmitted in a beam-sweeping manner, where the set of beams to be swept may be predetermined. A UE may measure reference beams that carry synchronization signals (SS) and/or channel state information reference signals (CSI-RS) to determine a set of candidate beams on which the UE may receive broadcast information. The UE may then monitor resources associated with its candidate beam set to receive broadcasted information with high gain.

As the demand for mobile broadband access continues to increase, research and development continue to advance beamforming communication technologies, including technologies for transmitting group common control information in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to the transmission of group common control information to a group of user equipment (UEs) in 5G New Radio (NR) wireless communication systems. The group common control information may be transmitted on a group of transmit beams in a full or partial beam-sweeping configuration, where the group of transmit beams are selected based on one or more candidate beams associated with each of the UEs within the group of UEs.

In some examples, a base station may transmit a plurality of reference beams, each including a reference signal, in an initial full beam-sweeping configuration (e.g., across all beams) to a plurality of UEs (including the group of UEs) in a cell. Each UE may measure the reference beams to identify a respective set of candidate beams corresponding to ones of the reference beams on which the UE may receive information from the base station with high gain. Each UE may then transmit a respective beam measurement report indicating the respective set of candidate beams to the base station. In some examples, the base station may identify the set of candidate beams utilizing uplink measurements (e.g., by measuring a value of a sounding reference signal (SRS) or other uplink reference signal).

The base station may then select the group of transmit beams from the sets of candidate beams provided by the group of UEs. In some examples, the base station may select the group of transmit beams from the respective sets of candidate beams provided by the UEs within the group, such that at least one candidate beam from each candidate set is selected. In some examples, the base station may further identify a spatial quasi-colocation (QCL) relationship between the reference beams corresponding to the group of transmit beams and resources reserved for the group common control information. For example, the base station may identify a spatial QCL relationship between each reference beam corresponding to one of the transmit beams within the group of transmit beams and physical downlink control channel resources within which the group common control information may be transmitted.

In one aspect of the disclosure, a method of wireless communication at a scheduling entity. The method includes transmitting a plurality of reference beams, each including a reference signal, in a beam-sweeping configuration, and for each of a plurality of scheduled entities, identifying a respective set of candidate beams on which a respective scheduled entity of the plurality of scheduled entities can receive information from the scheduling entity, in which each of the candidate beams corresponds to one of the plurality of reference beams. The method further includes identifying a group of scheduled entities including a subset of the plurality of scheduled entities, selecting a group of transmit beams from the respective sets of candidate beams of each of the scheduled entities within the group of scheduled entities, and transmitting group common control information to the group of scheduled entities utilizing the group of transmit beams.

Another aspect of the disclosure provides an apparatus for wireless communication. The apparatus includes a processor, a transceiver communicatively coupled to the processor, and a memory communicatively coupled to the processor. The processor is configured to transmit a plurality of reference beams, each including a reference signal, in a beam-sweeping configuration, and for each of a plurality of scheduled entities, identify a respective set of candidate beams on which a respective scheduled entity of the plurality of scheduled entities can receive information from the scheduling entity, in which each of the candidate beams corresponds to one of the plurality of reference beams. The processor is further configured to identify a group of scheduled entities including a subset of the plurality of scheduled entities, select a group of transmit beams from the respective sets of candidate beams of each of the scheduled entities within the group of scheduled entities, and transmit group common control information to the group of scheduled entities utilizing the group of transmit beams.

Another aspect of the disclosure provides a method of wireless communication at a scheduled entity. The method includes receiving a plurality of reference beams, each including a reference signal, transmitted by a scheduling entity in a beam-sweeping configuration, and identifying a set of candidate beams on which the scheduled entity can receive information from the scheduling entity, in which each of the candidate beams corresponds to one of the plurality of reference beams. The method further includes receiving spatial quasi-colocation (QCL) information including a spatial QCL relationship between at least one selected candidate beam within the set of candidate beams and corresponding resources reserved for group common control information to be transmitted by the scheduling entity to a plurality of scheduled entities comprising the scheduled entity, and receiving the group common control information utilizing at least one receive beam corresponding in direction to the at least one selected candidate beam and the corresponding resources.

Another aspect of the disclosure provides an apparatus for wireless communication. The apparatus includes a processor, a transceiver communicatively coupled to the processor, and a memory communicatively coupled to the processor. The processor is configured to receive a plurality of reference beams, each including a reference signal, transmitted by a scheduling entity in a beam-sweeping configuration, and identify a set of candidate beams on which the scheduled entity can receive information from the scheduling entity, in which each of the candidate beams corresponds to one of the plurality of reference beams. The processor is further configured to receive spatial quasi-colocation (QCL) information including a spatial QCL relationship between at least one selected candidate beam within the set of candidate beams and corresponding resources reserved for group common control information to be transmitted by the scheduling entity to a plurality of scheduled entities comprising the scheduled entity, and receive the group common control information utilizing at least one receive beam corresponding in direction to the at least one selected candidate beam and the corresponding resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
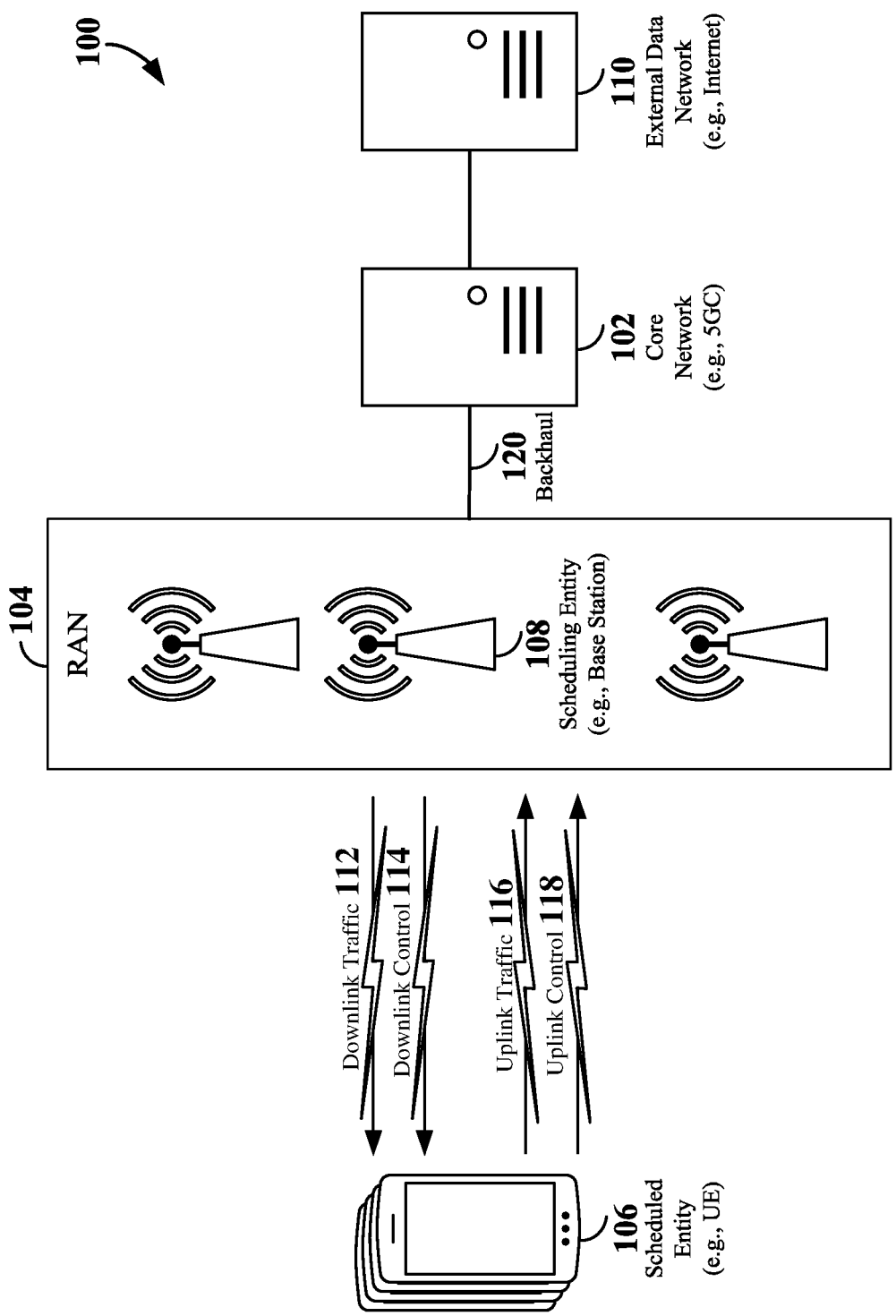
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless communication systems, path loss can be very high and range may be limited. Beamforming is a technique that may be used to direct or concentrate the wireless signal to a desired direction to mitigate path loss and/or extend communication range. For a beamformed transmission, the amplitude and phase of each antenna in an array of antennas may be precoded, or controlled to create a desired (i.e., directional) pattern of constructive and destructive interference in the wavefront. Therefore, a beam may provide more energy in a certain direction to the receiver.

A base station may transmit one or more beam reference signals utilizing a beam-sweeping configuration by sweeping in all directions so that a user equipment (UE) may identify a set of one or more candidate beams that provide the highest gain for that particular UE. For example, the UE may measure the one or more beam reference signals to identify the set of one or more candidate beams on which the UE can receive information from the base station. Based on a spatial quasi-colocation (QCL) relationship or association between the reference beams and resources for broadcasting information within the cell, the UE may monitor the resources associated with its candidate beam set to receive the broadcasted information. The UE may also transmit a beam measurement report indicating the set of one or more candidate beams to the base station to enable the base station to utilize one or more of the candidate beams as transmit beams to transmit UE-specific control information and/or user data traffic to the UE. In some examples when the channel is reciprocal, the base station may identify the set of one or more candidate beams utilizing uplink measurements (e.g., by measuring an uplink reference signal).

The base station may further transmit group common control information to a group or subset of UEs within the cell. In some instances, the UEs within the group may not be co-located, and therefore, beam-sweeping may also be utilized to transmit the group common control information to all of the UEs within the group. However, full beam-sweeping to cover the entire cell, as is performed for broadcasted information, may not be needed. Therefore, various aspects of the disclosure are directed to identifying a group or subset of transmit beams (corresponding in direction to a group or subset of the reference beams) for use in transmitting the group common control information to the group or subset of UEs. In some examples, the group of transmit beams may be selected from the different sets of candidate beams for each of the UEs within the group. For example, based on the UE capabilities, the group of transmit beams may include one or more candidate beams from each set of candidate beams associated with the UEs in the group.

Various aspects of the disclosure are further directed to configuring the spatial QCL relationship or association between the reference beams corresponding in direction to the group of transmit beams and the resources reserved for transmitting the group common control information. For example, the base station may reserve respective time-frequency resources for each transmit beam in the group of transmit beams to transmit the group common control information based on the respective spatial QCL relationship between each reference beam corresponding in direction to one of the transmit beams and the time-frequency resources.

The base station may further transmit the spatial QCL relationship between the reference beams corresponding in direction to the group of transmit beams and the corresponding resources reserved for the group common control information to each UE in the group via radio resource control (RRC) signaling, medium access control-control element (MAC-CE) signaling, or downlink control information (DCI)-based signaling. In some examples, the base station may transmit to each UE only the spatial QCL relationship(s) for the one or more reference beams corresponding in direction to the one or more transmit beams in the group that are associated with that UE (e.g., the reference beams corresponding in direction to the one or more transmit beams within the group that are in the UE's set of candidate beams). The base station may then transmit the group common control information within physical downlink control channels associated with the reserved time-frequency resources to the group of UEs utilizing the group of transmit beams in a partial beam-sweeping configuration (e.g., a beam-sweeping configuration utilizing less than all of the beams, as determined by the transmit beam group). In examples where the group of transmit beams includes all of the beams (e.g., when there are a large number of UEs in the group and all beams are necessary for transmission to all of the UEs in the group), a full beam-sweeping may be performed.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
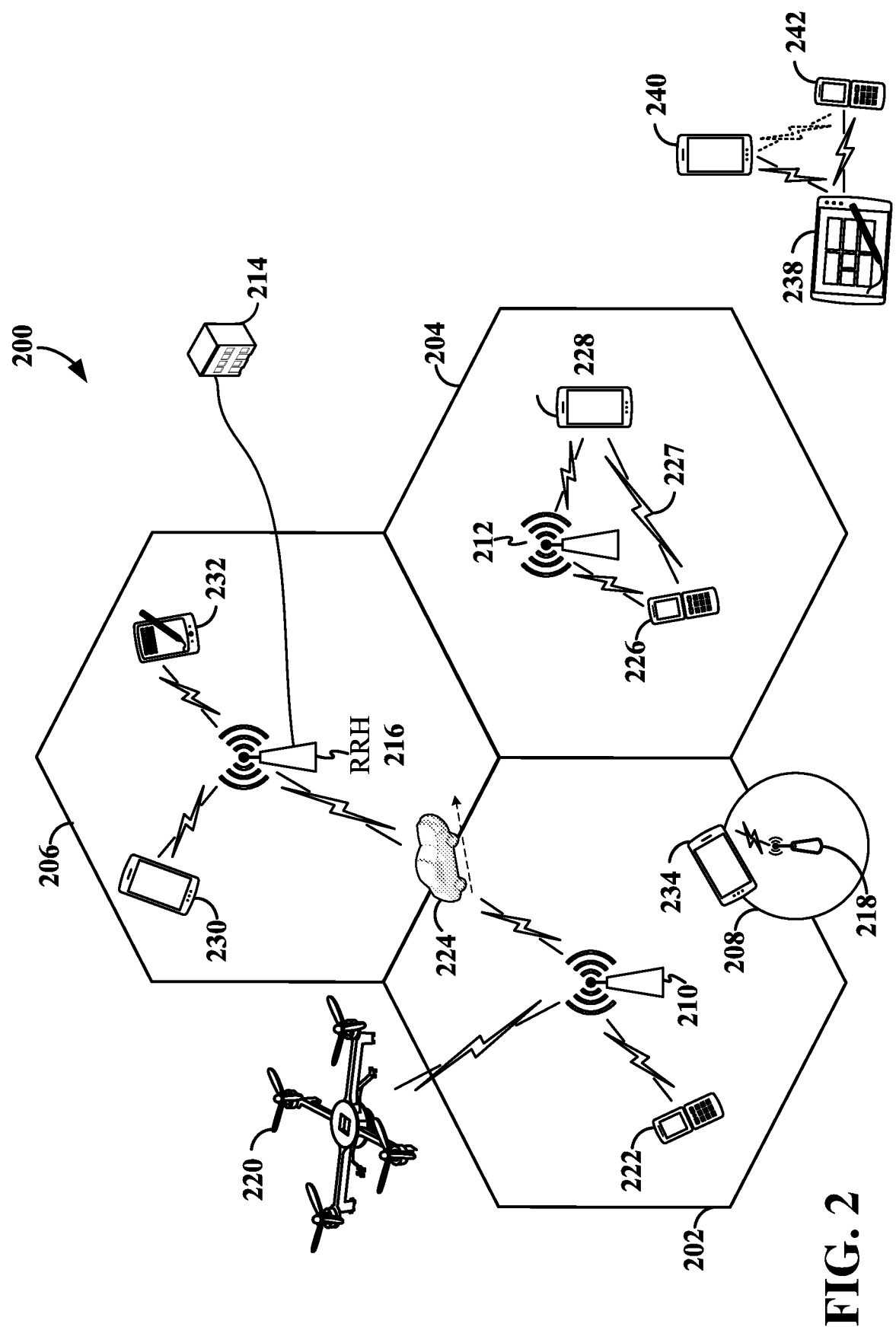
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
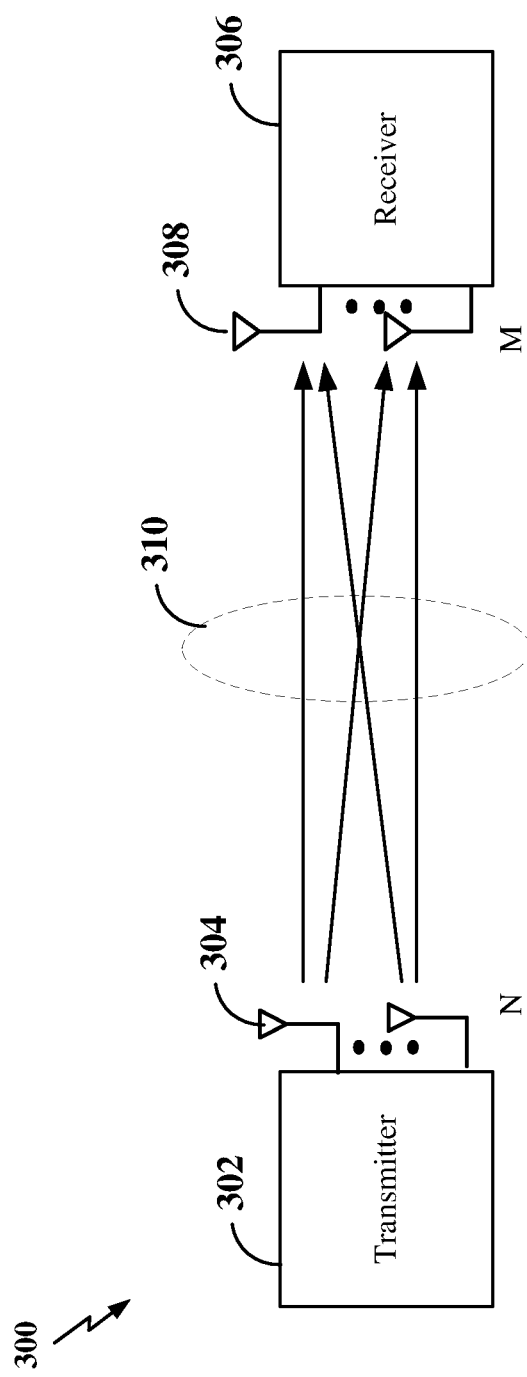
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
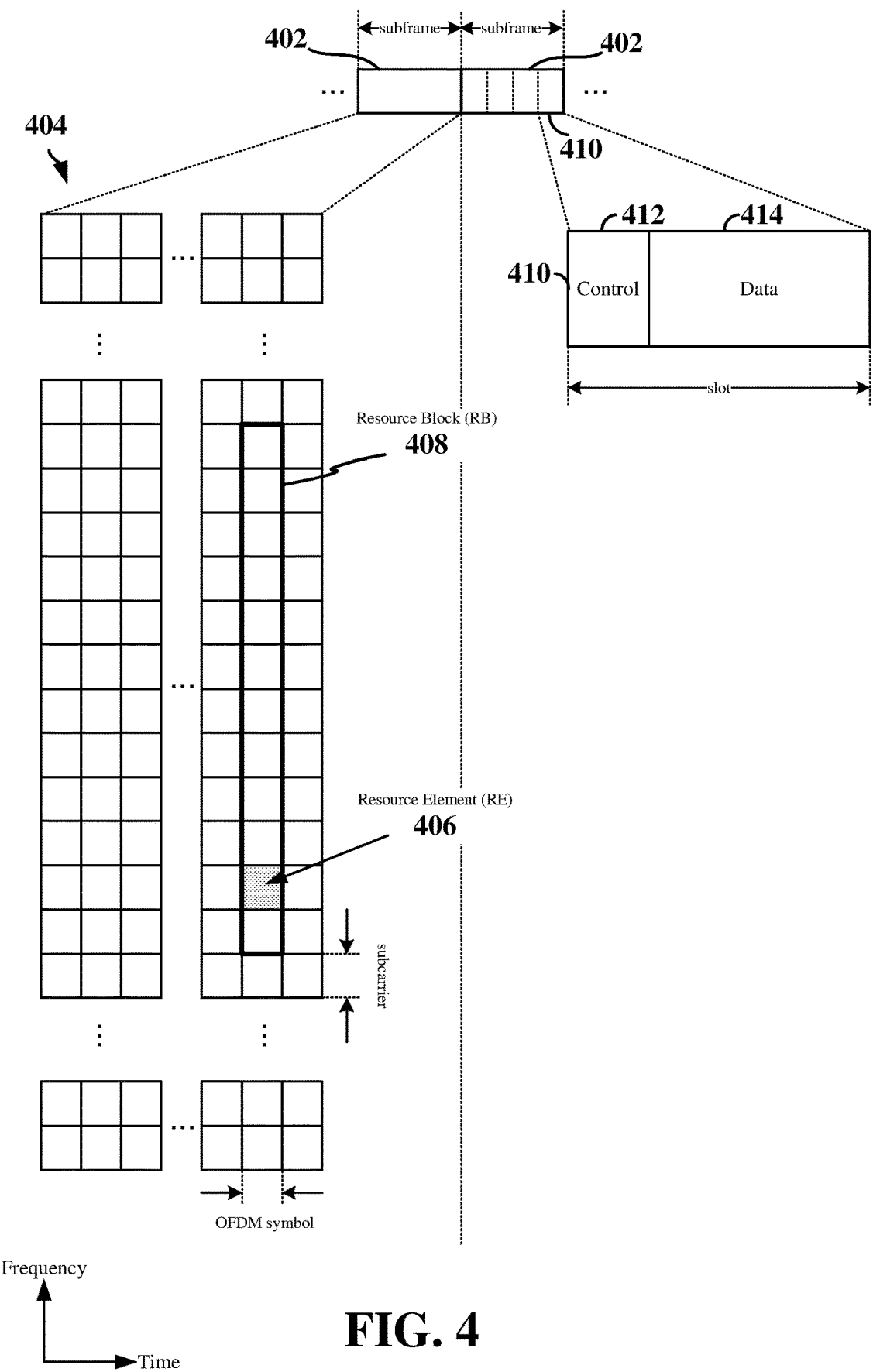
FIG. 4 is a schematic diagram illustrating organization of wireless resources in an air interface utilizing orthogonal frequency divisional multiplexing (OFDM).

Referring now to FIG. 4, an expanded view of an exemplary DL subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information may include a scheduling request (SR), i.e., request for the scheduling entity 108 to schedule uplink transmissions. Here, in response to the SR transmitted on the control channel, the scheduling entity 108 may transmit downlink control information that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In 5G New Radio (NR) systems, particularly for above 6 GHz or mmWave systems, beamformed signals may be utilized for most downlink channels, including the PDCCH and PDSCH. In addition, broadcast control information, such as the master information block (MIB), system information block (SIB), minimum SIB (MSIB), and paging information, may be transmitted in a beam-sweeping manner to enable all scheduled entities (UEs) in the coverage area of a transmission and reception point (TRP) (e.g., a gNB) to receive the broadcast control information.

Figure 5:
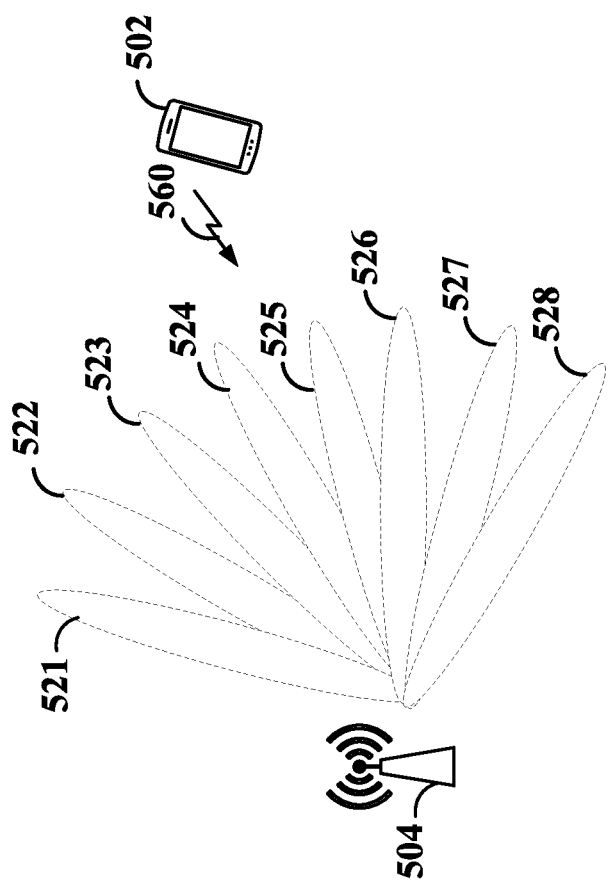
FIG. 5 illustrates an example of communication between a base station and a user equipment (UE) using beamforming according to some aspects of the disclosure.

FIG. 5 is a diagram illustrating communication between a base station (BS) 504, such as a gNB, and a UE 502 using beamformed signals according to some aspects of the disclosure. The base station 504 may be any of the base stations or scheduling entities illustrated in FIGS. 1 and 2, and the UE 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol or time may not be adjacent to one another. In some examples, the BS 504 may transmit more or less beams distributed in all directions (e.g., 360 degrees).

In one example, a beam set may contain eight different beams. For example, FIG. 5 illustrates eight beams 521, 522, 523, 524, 525, 526, 527, 528 for eight directions. In some aspects of the disclosure, the base station (BS) 504 may be configured to transmit at least one of the beams 521, 522, 523, 524, 525, 526, 527, 528 toward the UE 502. For example, the BS 504 can sweep or transmit in eight directions using eight ports (e.g., antenna ports) during a synchronization slot. The BS 504 may transmit a reference beam for each beam in the different beam directions during the synchronization slot. Each reference beam may include a reference signal, such as a synchronization signal (SS) or a channel state information reference signal (CSI-RS), and thus may also be referred to herein as a beam reference signal (BRS). The receiver can use the BRS to identify the beam by performing received power measurements on the BRS.

The UE 502 may determine or select a set of one or more candidate beams in the beam set that are strongest (e.g., have the strongest signal) or are preferable, and therefore, may provide the highest gain. For example, the UE 502 may determine that beams 524 and 525 carrying a BRS are strongest or preferable. In some examples, the UE 502 may select the set of candidate beams by measuring values for a received power or received quality associated with each beam in the set of beams 521-528, comparing respective values to one another, and selecting the one or more candidate beams that corresponds to the greatest, highest, or best value. The UE 502 may transmit a beam measurement report 560 indicating the set of candidate beams 524 and 526 on which the UE 502 may receive information (e.g., control information and/or user data traffic) from the BS 504 with the highest gain. In one example, the beam measurement report 560 may include a respective beam index, along with the measured power or quality, of each candidate beam in the set of candidate beams 524 and 525. In other examples, the beam measurement report 560 may include the respective beam index and measured power or quality of each beam 521-528. In this example, the BS 504 may determine the set of candidate beams 524 and 525.

In other examples, when the channel is reciprocal (e.g., the DL and UL channels are the same), the BS 504 may derive the candidate beams for the UE 504 from UL measurements, such as by measuring the received power, quality, or other variable of a sounding reference signal (SRS) or other UL reference signal. In this example, the UE may not transmit the beam measurement report 560 to the BS 504.

The number of candidate beams may be predetermined or may be ascertained by comparing each of the measured values to a minimum threshold below which the beam would not be selected for inclusion in the candidate set. The BS 504 may select one or more of the candidate beams for use in transmitting unicast information (e.g., UE-specific control information and/or user data traffic) to the UE 504.

For broadcast control information, a spatial quasi-colocation (QCL) relationship or association between each of the reference beams 521-528 and resources (e.g., PDCCH time-frequency resources) utilized for broadcasting control information may be pre-configured or pre-determined by the network. The spatial QCL relationship indicates the respective time-frequency resources on which each beam may include broadcast control information.

Figure 6:
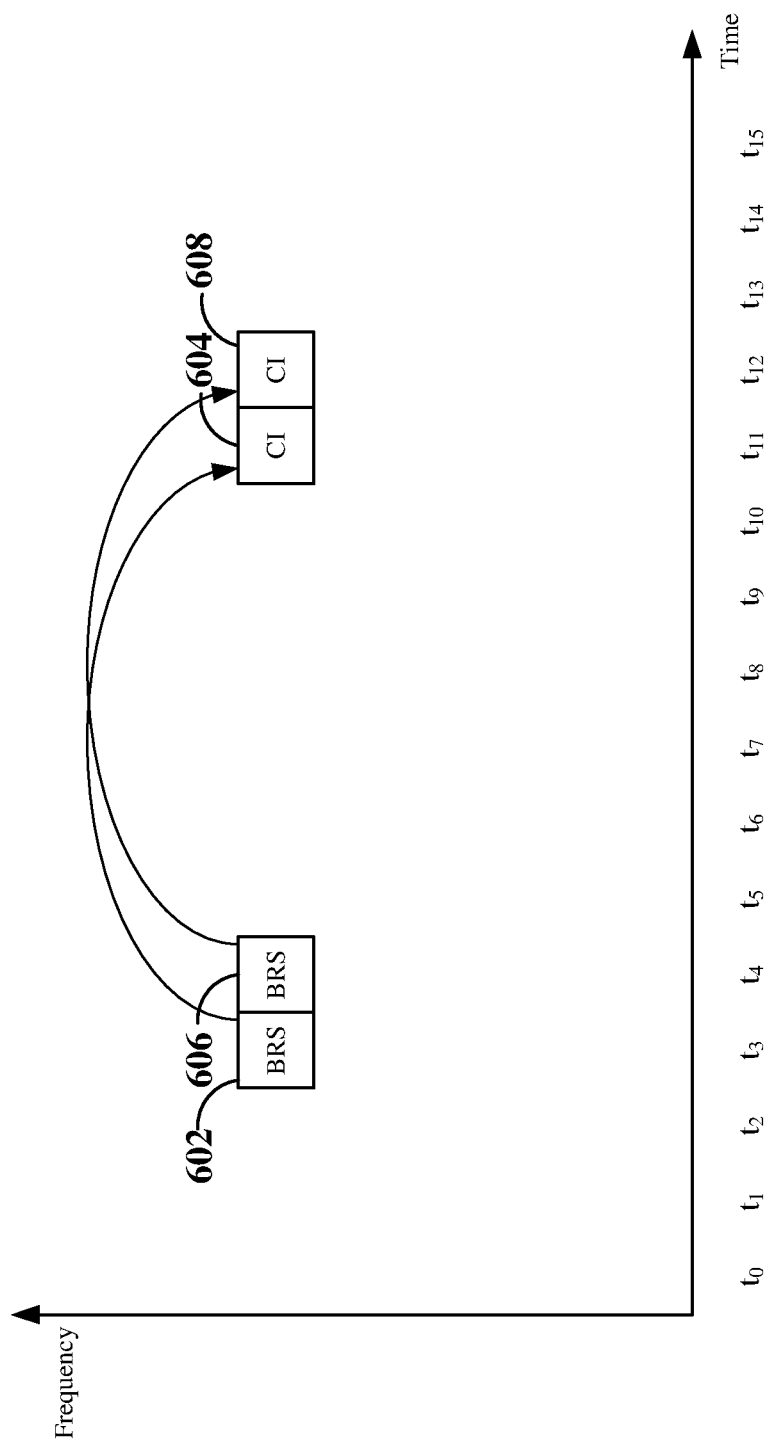
FIG. 6 illustrates an example of a spatial QCL relationship between reference beams carrying beam reference signals (BRSs) and transmit beams carrying broadcast control information (CI) according to some aspects of the disclosure.

FIG. 6 illustrates an example of a spatial QCL relationship between reference beams carrying beam reference signals (BRSs) and transmit beams carrying broadcast control information (CI). Time is in the horizontal direction, while frequency is in the vertical direction to schematically represent time-frequency resources utilized to transmit BRS and CI over reference beams and transmit beams.

In the example shown in FIG. 6, a first reference beam 602 (e.g., which may, for example, correspond to reference beam 524 shown in FIG. 5) carrying a beam reference signal (BRS) is transmitted at time $t_3$. The first reference beam 602 may be spatial QCL'd with a corresponding first transmit beam 604 transmitted in the same direction as the first reference beam 602 that carries broadcast control information (CI) at time $t_{11}$. In addition, a second reference beam 606 (e.g., which may, for example, correspond to reference beam 525 shown in FIG. 5) carrying a beam reference signal (BRS) is transmitted at time $t_4$. The second reference beam 606 may be spatial QCL'd with a corresponding second transmit beam 608 transmitted in the same direction as the second reference beam 606 that carries broadcast control information (CI) at time $t_{12}$. Thus, a UE (e.g., UE 504 shown in FIG. 5) may monitor the resources at time $t_{11}$ and/or $t_{12}$ for the broadcast control information (CI) transmitted over transmit beams 604 and 608 to receive the broadcast CI with high gain. Although a time-based beam-sweeping and corresponding spatial QCL relationship has been described above, in other examples, the reference beams may be swept in frequency and spatial QCL'd to time-frequency broadcast resources.

Some of the broadcast control information may be intended for only some of the UEs, not all of the UEs in the cell. Such control information may be referred to herein as group common control information. Examples of group common control information may include, but are not limited to a pre-emption indication, a HARQ feedback resource indication, slot format indicator(SFI), and/or a transmit power control (TPC) command for multiple UEs. To transmit the group common control information to all of the UEs within the group, a beam-sweeping mechanism similar to that utilized for broadcast information may be used.

However, beam-sweeping of the entire cell may not be needed to transmit the group common control information to all of the UEs in the group. Therefore, various aspects of the disclosure relate to identifying a group or subset of transmit beams (corresponding in direction to a group or subset of the reference beams) for use in transmitting the group common control information to the group or subset of UEs.

Figure 7:
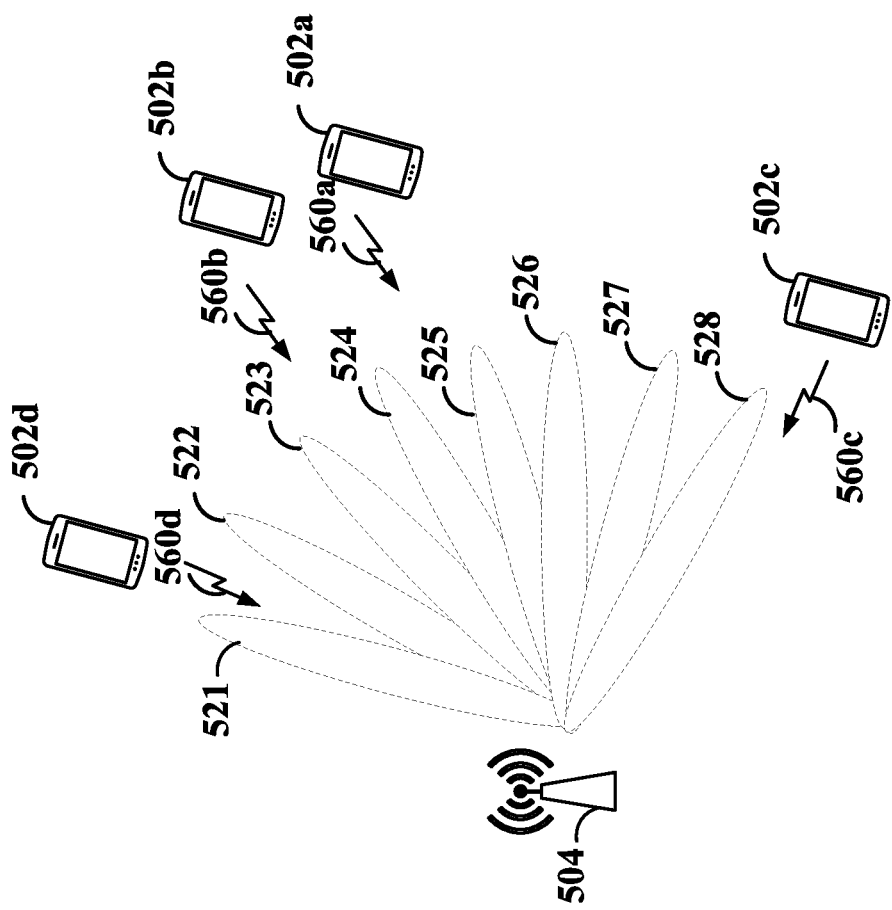
FIG. 7 illustrates an example of communication between a base station and a plurality of user equipment (UEs) using beamforming according to some aspects of the disclosure.

FIG. 7 is a diagram illustrating communication between the BS 504 and a plurality of UEs 502a, 502b, 502c, and 502d using beamformed signals according to some aspects of the disclosure. In some examples, each of the UEs 502a, 502b, 502c, and 502d may measure the received power or quality of each of the reference beams 521-528 and transmit respective beam measurement reports 560a, 560b, 560c, and 560d indicating the respective set of candidate beams on which the UEs 502a-502d may receive information from the BS 504 with the highest gain. For example, the set of candidate beams indicated in the beam measurement report 560a provided by UE 502a may include reference beams 524 and 525, the set of candidate beams indicated in the beam measurement report 560b provided by UE 502b may include reference beams 523 and 524, the set of candidate beams indicated in the beam measurement report 560c provided by UE 502c may include reference beam 528, and the set of candidate beams indicated in the beam measurement report 560d provided by UE 502d may include reference beams 521 and 522.

In various aspects of the disclosure, if the BS 504 determines that group common control information is to be sent to a group of UEs formed of a subset of the UEs 502a-502d in the cell, the BS 504 may identify and select a group or subset of transmit beams from the respective sets of candidate beams provided by the UEs within the group on which to transmit the group common control information. Each selected transmit beam corresponds in direction to one the reference beams 521-528. For example, to transmit group common control information to UE 502d, a transmit beam having the same direction as reference beam 521 may be selected.

In an example, the BS 504 may determine that a transmit power control (TPC) command is to be sent to a group of UEs (e.g., UEs 502a, 502b, and 502c). Based on the beam measurement reports 560a, 560b, and 560c provided by UEs 502a, 502b, and 502c (or from the candidate sets determined by the BS 504 utilizing uplink reference signal measurements for reciprocal UL/DL channels), the BS 504 may identify a group of transmit beams corresponding in direction to selected reference beams on which to transmit the group common control information.

Figure 8:
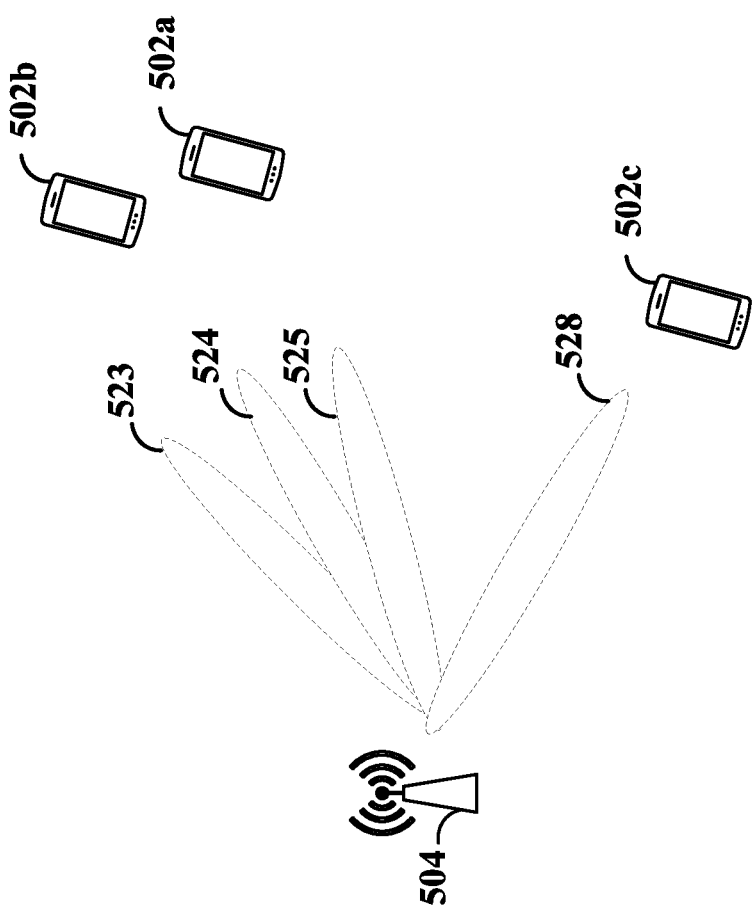
FIG. 8 illustrates an example of communication of group common control information between a base station and a plurality of user equipment (UEs) using beamforming according to some aspects of the disclosure.

FIG. 8 illustrates an example of a subset of reference beams 523, 524, 525, and 528 selected to transmit group common control information on corresponding transmit beams to a subset of UEs 502a, 502b, and 502c. In the example illustrated in FIG. 8, all of the candidate beams in each of the candidate beam sets associated with each of the UEs 502a, 502b, and 502c in the group were selected. Therefore, each UE that receives the group common control information on more than one transmit beam (e.g., UEs 502a and 502b) may combine the group common control information received on each beam prior to decoding.

Figure 9:
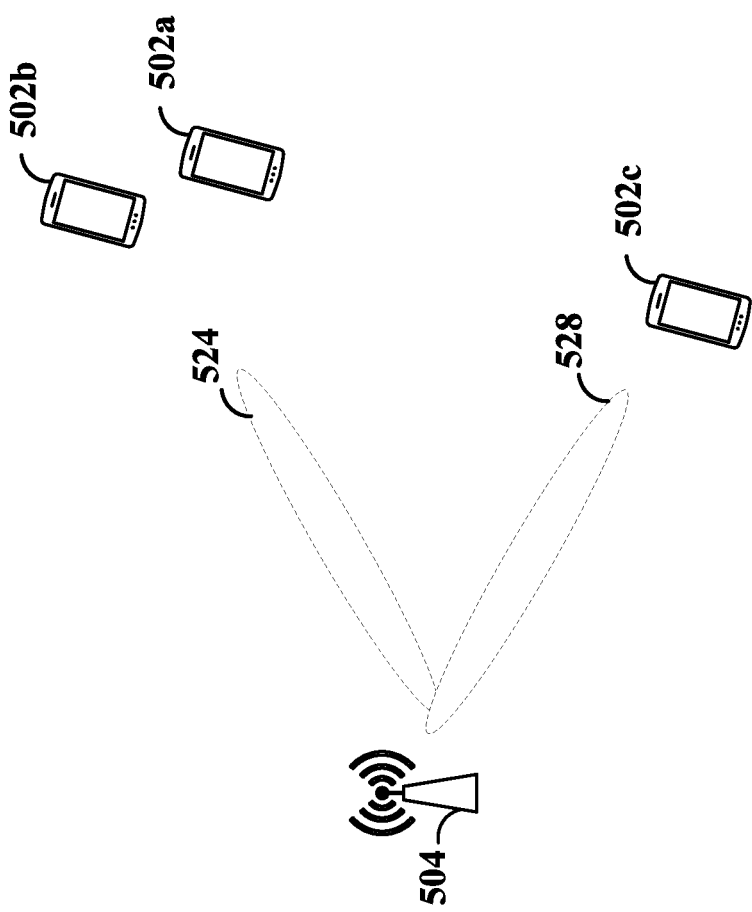
FIG. 9 illustrates another example of communication of group common control information between a base station and a plurality of user equipment (UEs) using beamforming according to some aspects of the disclosure.

FIG. 9 illustrates another example of a subset of reference beams 524 and 528 selected to transmit group common control information to a subset of UEs 502a, 502b, and 502c. In the examples illustrated in FIG. 9, less than all of the candidate beams in each of the candidate beam sets associated with each of the UEs 502a, 502b, and 502c in the group may be selected as transmit beams. For example, since UEs 502a and 502b both indicated that reference beam 524 provided high gain in their respective beam measurement reports 560a and 560b, the BS 504 may select only a single transmit beam corresponding in direction to reference beam 524 for both UEs 502a and 502b. In this example, the selected group of transmit beams for the group TPC command may correspond in direction to only reference beams 524 and 528. In general, the group or subset of transmit beams selected to transmit the group common control information may include at least one candidate beam from each set of candidate beams indicated by the beam measurement reports 560a, 560b, and 560c provided by the UEs 502a, 502b, and 502c in the group.

In addition, to enable each of the UEs 502a, 502b, and 502c in the group to monitor the correct resources to receive the group common control information, a spatial QCL relationship between the reference beams (e.g., reference beams 524 and 528) and resources reserved for the group common control information may be identified.

Figure 10:
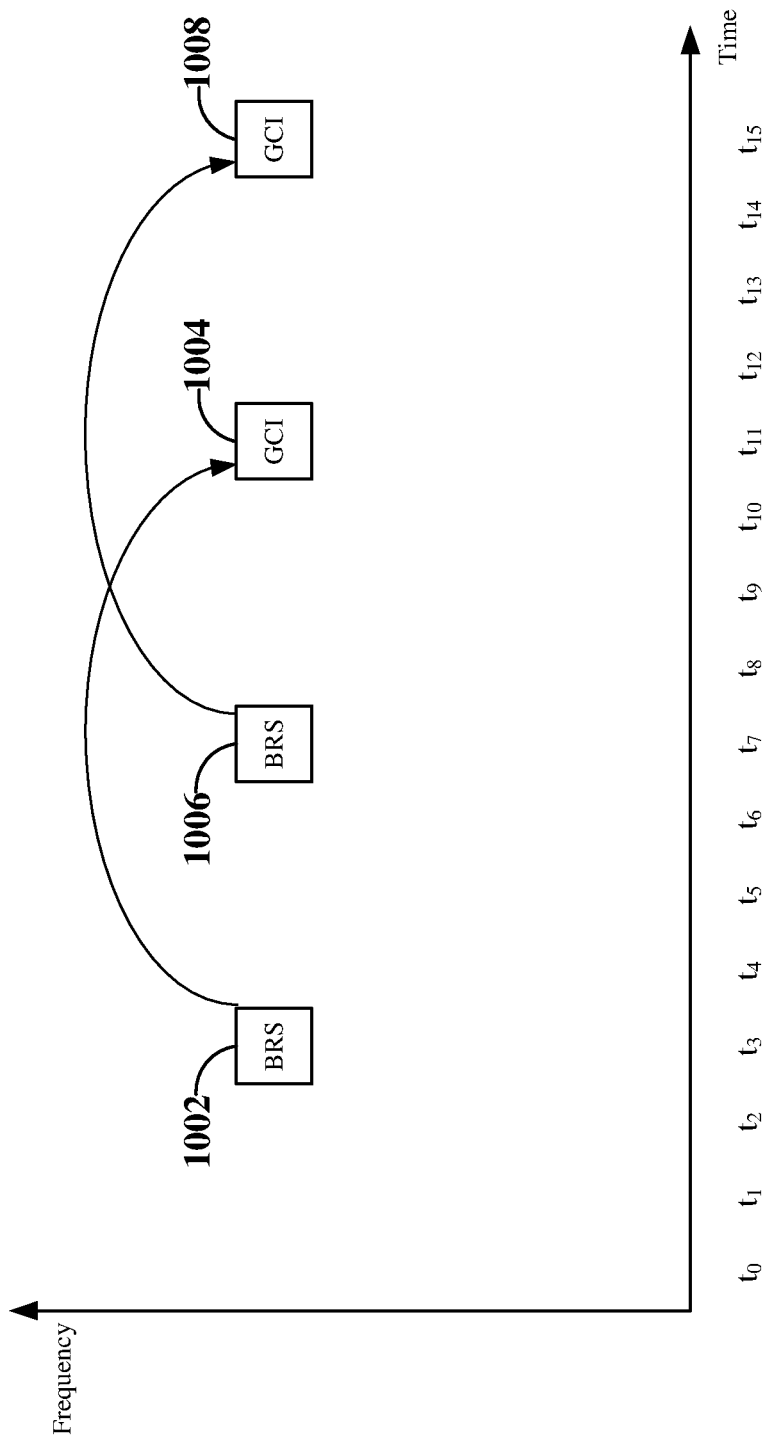
FIG. 10 illustrates an example of a spatial QCL relationship between reference beams carrying beam reference signals (BRSs) and transmit beams carrying group common control information (GCI) according to some aspects of the disclosure.

FIG. 10 illustrates an example of a spatial QCL relationship between reference beams carrying beam reference signals (BRSs) and transmit beams carrying group common control information (GCI). Time is in the horizontal direction, while frequency is in the vertical direction to schematically represent time-frequency resources utilized to transmit BRS and GCI over reference beams and transmit beams.

In the example shown in FIG. 10, a first reference beam 1002 (e.g., which may, for example, correspond to reference beam 524 shown in FIG. 9) carrying a beam reference signal (BRS) is transmitted at time $t_3$. The first reference beam 1002 may be spatial QCL'd with a corresponding first transmit beam 1004 transmitted in the same direction as the first reference beam 1002 that carries group common control information (GCI) at time $t_{11}$. In addition, a second reference beam 1006 (e.g., which may, for example, correspond to reference beam 528 shown in FIG. 9) is transmitted at time $t_7$. The second reference beam 1006 may be spatial QCL'd with a corresponding second transmit beam 1008 transmitted in the same direction as the second reference beam 1006 that carries group common control information (GCI) at time $t_{15}$.

Figure 11:
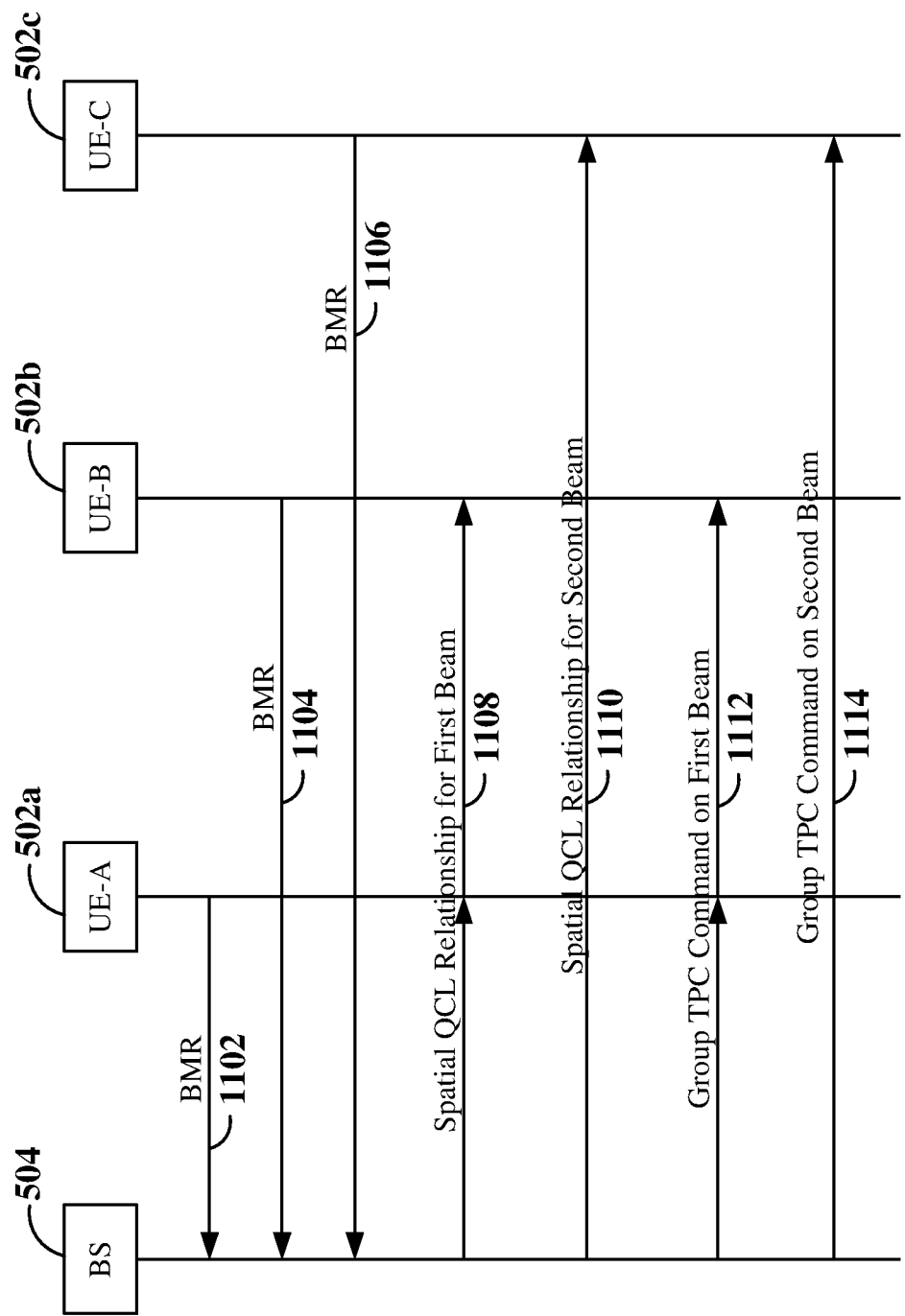
FIG. 11 is a signaling diagram illustrating exemplary signaling for providing a spatial QCL relationship between reference beams and transmit beams to transmit group common control information to a group of UEs according to some aspects of the disclosure.

FIG. 11 is a signaling diagram illustrating exemplary signaling for providing a spatial QCL relationship between reference beams and transmit beams to transmit group common control information to a group of UEs 502a, 502b, and 502c. At 1102, 1104, and 1106, each of the UEs 502a, 502b, and 502c generates and transmits a respective beam measurement report (BMR) to the BS 504. Each BMR indicates the respective set of candidate beams on which the respective UE 502a, 502b, and 502 cmay receive information (e.g., control information and/or user data traffic) from the BS 504 with the highest gain. In one example, the BMR may include a respective beam index, along with the measured power or quality, of each candidate beam in the set of candidate beams. In other examples, the BMR may include the respective beam index and measured power or quality of each beam. In this example, the BS 504 may determine the respective set of candidate beams for each UE 502a, 502b, and 502c.

At 1108 and 1110, the BS 504 may determine the respective spatial QCL relationship for each UE 502a, 502b, and 502c in the group and transmit respective spatial QCL relationship information to each UE 502a, 502b, and 502c via higher layer signaling (e.g., via Radio Resource Control (RRC) signaling, medium access control-control element (MAC-CE) signaling, or downlink control information (DCI)-based signaling). For example, at 1108, the BS 504 may transmit the spatial QCL relationship between a first reference beam (e.g., which may correspond to, for example, reference beam 524 or 1002 shown in FIGS. 9 and 10) and the time-frequency resources (e.g., at time $t_{11}$ in FIG. 10) that the BS 504 will utilize to transmit a group TPC command to UEs 502a and 502b via respective RRC or other type of signaling. In addition, at 1110, the BS 504 may transmit the spatial QCL relationship between a second reference beam (e.g., which may correspond to, for example, reference beam 528 or 1006 shown in FIGS. 9 and 10) and the time-frequency resources (e.g., at time $t_{15}$ in FIG. 10) that the BS 504 will utilize to transmit the group TPC command to UE 502c via RRC or other type of signaling. At 1112 and 1114, the BS 504 may then transmit the group TCP command to the group of UEs 502a, 502b, and 502c utilizing the selected group of transmit beams and corresponding time-frequency resources in a partial beam-sweeping configuration between the different transmit beams. For example, the BS 504 may transmit the group TCP command within the respective DCI of respective PDCCHs transmitted at times $t_{11}$ and $t_{15}$, as shown in FIG. 10.

Figure 12:
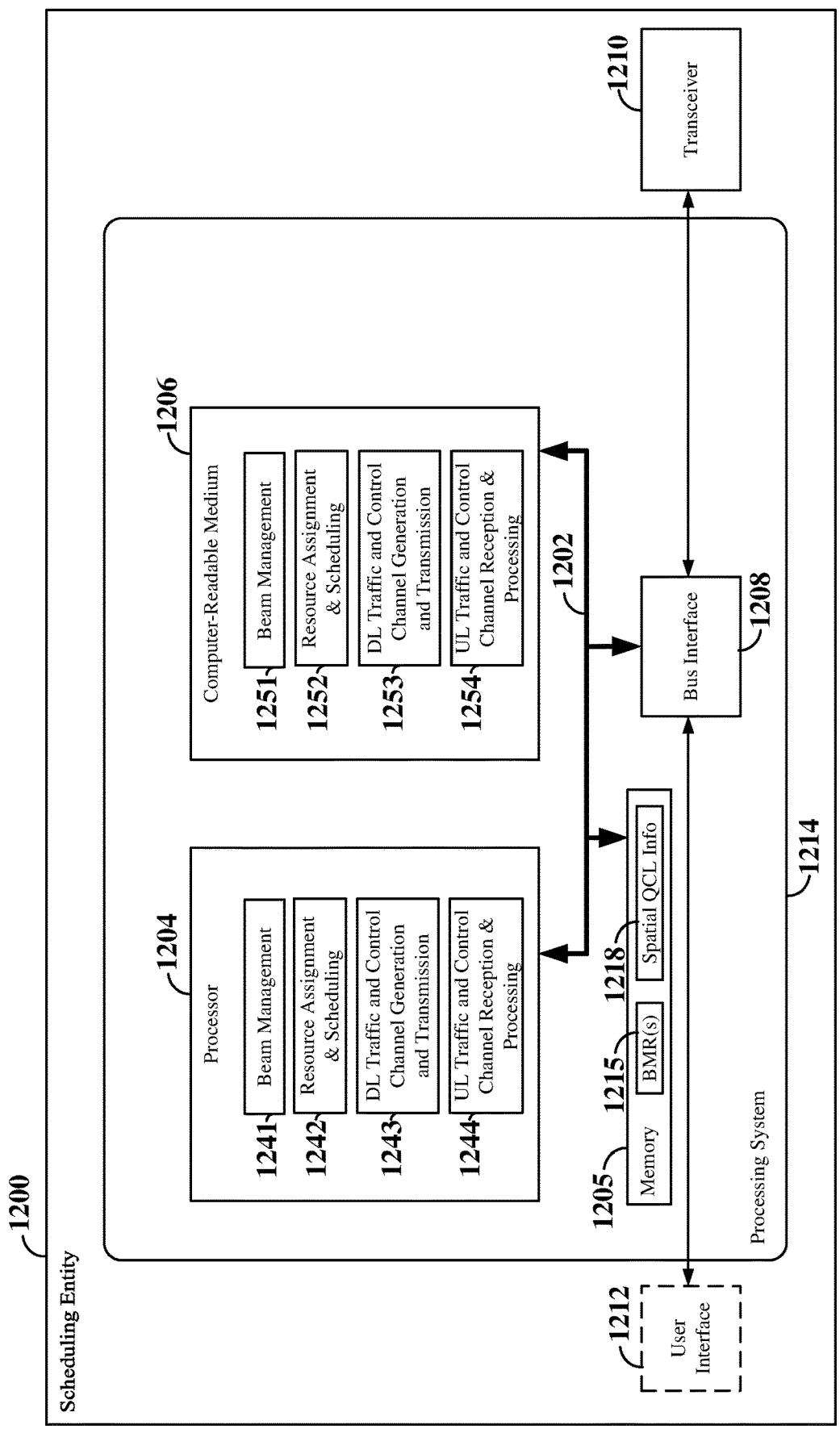
FIG. 12 is a block diagram illustrating an example of a hardware implementation for a scheduling entity employing a processing system according to some aspects of the disclosure.

FIG. 12 is a block diagram illustrating an example of a hardware implementation for a scheduling entity 1200 employing a processing system 1214. For example, the scheduling entity 1200 may be a base station (e.g., eNB, gNB) as illustrated in any one or more of FIGS. 1-3,5,7-9, and/or 11.

The scheduling entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described below.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick, touchscreen) may also be provided. Of course, such a user interface 1212 is optional, and may be omitted in some examples, such as a base station.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. In some examples, the memory 1205 may be omitted, and data utilized by the processor 1204 when executing software may be stored on the computer-readable medium 1206.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include beam management circuitry 1241, configured to generate a set of beams, each having a different direction of transmission. For example, for each beam, the beam management circuitry 1241 may be configured to control the amplitude and phase of each antenna in an array of antennas to create a desired (i.e., directional) pattern of constructive and destructive interference in the wavefront. The beam management circuitry 1241 may further be configured to sweep or transmit a beam reference signal on each of the beams (e.g., in each of the different directions) during a synchronization slot. For example, the beam management circuitry 1241 may generate a respective reference beam in each of the different beam directions during the synchronization slot. Each reference beam may include a beam reference signal, such as a synchronization signal (SS) or a channel state information reference signal (CSI-RS).

The beam management circuitry 1241 may further be configured to receive a respective beam measurement report (BMR) 1215 from each UE served by the scheduling entity. Each BMR 1215 may indicate the set of candidate beams on which the UE may receive information (e.g., control information and/or user data traffic) from the BS with the highest gain. In one example, a BMR 1215 may include a respective beam index, along with the measured power or quality, of each candidate beam in the set of candidate beams. In other examples, a BMR 1215 may include the respective beam index and measured power or quality of each beam. In this example, the beam management circuitry 1241 may determine the set of candidate beams for a UE. The BMR(s) 1215 of the various UEs may be maintained, for example, in memory 1205.

The beam management circuitry 1241 may further be configured to select a group of transmit beams from the respective sets of candidate beams of each UE within a group of UEs. The group of transmit beams corresponds in direction to those reference beams in the UEs candidate beam sets that provided the highest respective gains for each of the UEs in the group. For example, the beam management circuitry 1241 may utilize the respective sets of one or more candidate beams from each of the UEs in the group (e.g., as determined based on respective BMRs 1215 received from each of the UEs in the group or based on uplink reference signal measurements for reciprocal UL/DLL channels) to select the group of transmit beams. In some examples, the group of transmit beams may include all of the candidate beams in each of the candidate beam sets of the UEs in the group. In other examples, the group of transmit beams may include at least one candidate beam from each candidate beam set of the UEs in the group.

The beam management circuitry 1241 may further be configured to sweep or transmit group common control information to the group of UEs on the selected group of transmit beams. The beam management circuitry 1241 may further be configured to execute beam management software 1251 included on the computer-readable storage medium 1206 to implement one or more functions described above and/or described below in relation to FIG. 13 and/or FIG. 14.

The processor 1204 may further include resource assignment and scheduling circuitry 1242, configured to generate, schedule, and modify a resource assignment or grant of time-frequency resources (e.g., a set of one or more resource elements). For example, the resource assignment and scheduling circuitry 1242 may schedule time-frequency resources within a plurality of time division duplex (TDD) and/or frequency division duplex (FDD) slots to carry user data traffic and/or control information to and/or from multiple UEs (scheduled entities).

In various aspects of the disclosure, the resource assignment and scheduling circuitry 1242 may further identify a group of UEs (scheduled entities) to receive group common control information and provide the list of UEs in the group of UEs to the beam management circuitry 1241 for selection of the group of transmit beams for the group of UEs. The resource assignment and scheduling circuitry 1242 may further be configured to schedule (reserve) time-frequency resources for transmitting the group common control information to the group of UEs. Each of the time-frequency resources scheduled for the group common control information may be identified based on a spatial QCL relationship between the time-frequency resource and one of the reference beams corresponding in direction to a selected transmit beam for the group of UEs.

For example, the resource assignment and scheduling circuitry 1242 may configure the spatial QCL relationship between the reference beams corresponding in direction to the group of transmit beams selected for the group of UEs and the time-frequency resources to utilize for transmitting the group common control information to the group of UEs. The resource assignment and scheduling circuitry 1242 may further generate spatial QCL information 1218 indicating the spatial QCL relationship for the transmission of group common control information to each UE in the group of UEs. In some examples, the spatial QCL information 1218 may include separate spatial QCL information 1218 for each UE in the group of UEs that identifies the spatial QCL relationship between the reference beam(s) corresponding in direction to the selected transmit beam(s) for the UE and the time-frequency resources to utilize for transmitting the group common control information on the selected transmit beam(s) to the UE. The spatial QCL information 1218 may further be maintained, for example, in memory 1205. In addition to the time-frequency resources, the resource assignment and scheduling circuitry 1242 may further configure the search space, DCI format, and other scheduling information for the group common control information. The resource assignment and scheduling circuitry 1242 may further be configured to execute resource assignment and scheduling software 1252 included on the computer-readable storage medium 1206 to implement one or more functions described above and/or described below in relation to FIG. 13 and/or FIG. 14.

The processor 1204 may further include downlink (DL) traffic and control channel generation and transmission circuitry 1243, configured to generate and transmit downlink user data traffic and control channels within one or more slots. The DL traffic and control channel generation and transmission circuitry 1243, together with the resource assignment and scheduling circuitry 1242, may further be configured to place the DL user data traffic and/or control information onto a time division duplex (TDD) or frequency division duplex (FDD) carrier by including the DL user data traffic and/or control information within one or more slots in accordance with the resources assigned to the DL user data traffic and/or control information.

In various aspects of the disclosure, the DL traffic and control channel generation and transmission circuitry 1243, together with the beam management circuitry 1241, may generate and transmit DL group common control information to a group of UEs in a beam-sweeping configuration in accordance with the scheduling information (e.g., time-frequency resources, beam index or other beam direction indication for the group of transmit beams, DCI format, etc.) provided by the resource assignment and scheduling circuitry 1242 for the group common control information. Examples of group common control information may include, but are not limited to a pre-emption indication, a HARQ feedback resource indication, and/or a transmit power control (TPC) command for multiple UEs. For example, the DL traffic and control channel generation and transmission circuitry 1243, together with the beam management circuitry 1241, may include the group common control information within the respective DCI of a group of physical downlink control channels (PDCCHs), each utilizing different time-frequency resources and a different one of the transmit beams within the group of transmit beams, as determined from the scheduling information. The DL traffic and control channel generation and transmission circuitry 1243, together with the beam management circuitry 1241, may then transmit each of the PDCCHs in a beam-sweeping configuration between the different transmit beams via the transceiver 1210 to the group of UEs.

The DL traffic and control channel generation and transmission circuitry 1243 may further generate and transmit RRC or other type of signaling to the group of UEs providing the spatial QCL relationship (spatial QCL information 1218) between the corresponding reference beams (e.g., beam indexes) and the resources reserved for the group common control information prior to transmission of the group common control information to the group of UEs. For example, the DL traffic and control channel generation and transmission circuitry 1243 may generate and transmit to a particular UE within the group of UEs spatial QCL information 1218 providing the spatial QCL relationship between the reference beam(s) indicated by that particular UE as providing high gain and the resources reserved for the group common control information to be transmitted utilizing transmit beams corresponding in direction to those reference beams(s). The DL traffic and control channel generation and transmission circuitry 1243 may further be configured to execute DL traffic and control channel generation and transmission software 1253 included on the computer-readable storage medium 1206 to implement one or more functions described above and/or described below in relation to FIG. 13 and/or FIG. 14.

The processor 1204 may further include uplink (UL) traffic and control channel reception and processing circuitry 1244, configured to receive and process uplink control channels and uplink traffic channels from one or more scheduled entities. For example, the UL traffic and control channel reception and processing circuitry 1244 may be configured to receive uplink user data traffic from one or more scheduled entities. The UL traffic and control channel reception and processing circuitry 1244 may further be configured to receive UL control information from a scheduled entity. For example, the UL traffic and control channel reception and processing circuitry 1244 may be configured to receive a beam measurement report from a scheduled entity (UE) indicating one or more candidate beams to utilize in transmitting information to the scheduled entity and to provide the beam measurement report to the beam management circuitry 1241 for processing. The UL traffic and control channel reception and processing circuitry 1244 may further receive uplink reference signals from one or more of the scheduled entities in the cell and measure the received power, quality or other variable associated with the uplink reference signals to identify the candidate beams for the one or more scheduled entities.

In general, the UL traffic and control channel reception and processing circuitry 1244 may operate together with the resource assignment and scheduling circuitry 1242 to schedule UL user data traffic transmissions, DL user data traffic transmissions and/or DL user data traffic retransmissions in accordance with the received UL control information. The UL traffic and control channel reception and processing circuitry 1244 may further be configured to execute UL traffic and control channel reception and processing software 1254 included on the computer-readable storage medium 1206 to implement one or more functions described above and/or described below in relation to FIG. 13 and/or FIG. 14.

Figure 13:
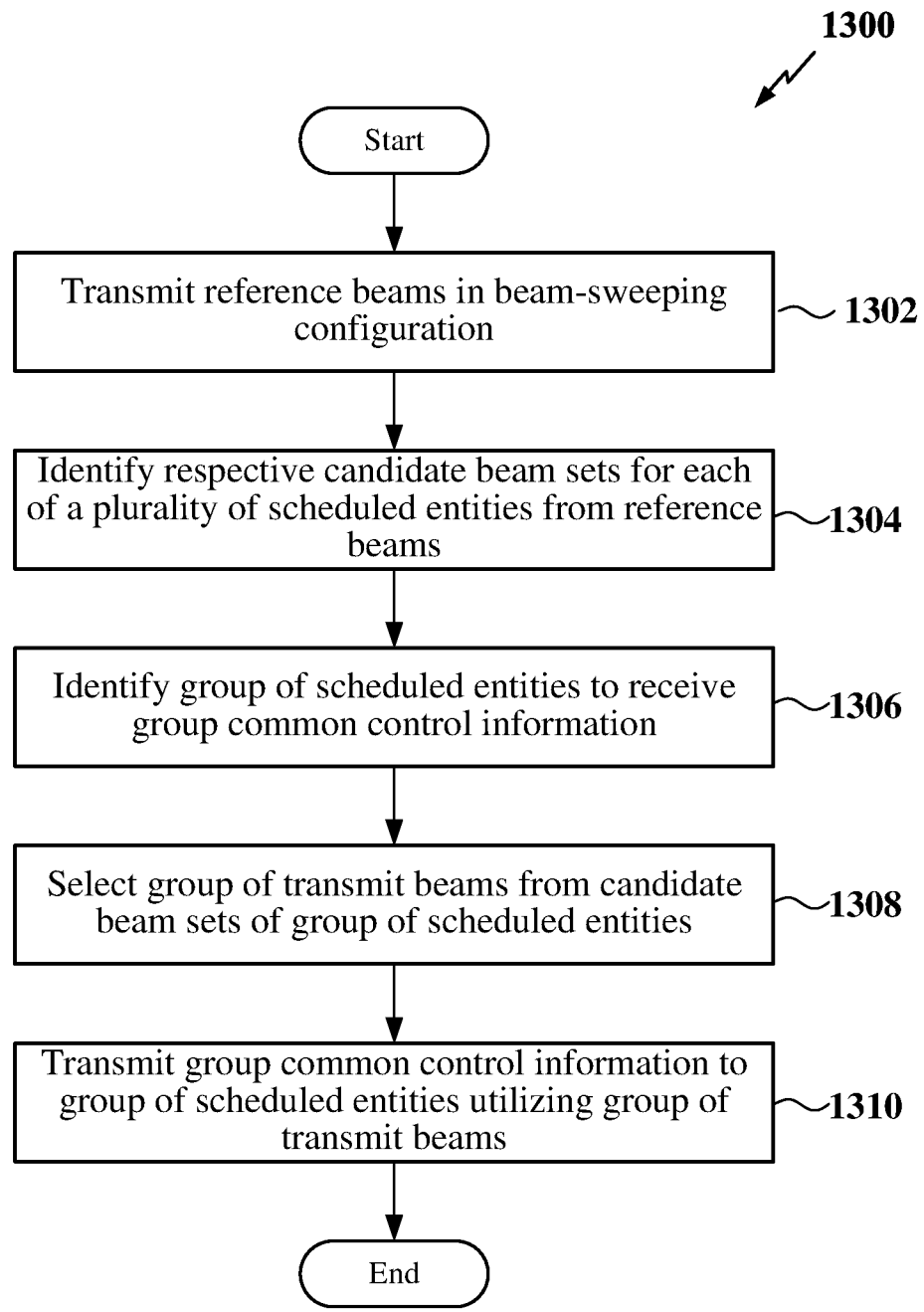
FIG. 13 is a flow chart illustrating an exemplary process operable at a scheduling entity for transmitting group common control information in a beam-sweeping configuration according to some aspects of the disclosure.

FIG. 13 is a flow chart illustrating a process 1300 for wireless communication of group common control information according to an aspect of the disclosure. As described below, some or all illustrated features may be omitted in a particular implementation within the scope of the present disclosure, and some illustrated features may not be required for implementation of all embodiments. In some examples, the process 1300 may be carried out by the scheduling entity illustrated in FIG. 12. In some examples, the process 1300 may be carried out by any suitable apparatus or means for carrying out the functions or algorithm described below.

At block 1302, the scheduling entity may transmit a plurality of reference beams in a beam-sweeping configuration throughout the coverage area (e.g., within a cell) of the scheduling entity. Each reference beam may include a reference signal, such as a synchronization signal (SS) or a channel state information reference signal (CSI-RS). For example, the DL traffic and control channel generation and transmission circuitry 1243, together with the beam management circuitry 1241, shown and described above in connection with FIG. 12 may transmit the reference beams.

At block 1304, for each of a plurality of scheduled entities, the scheduling entity may identify a respective set of one or more candidate beams from the reference beams on which a respective scheduled entity (UE) may receive information from the scheduling entity with high gain. In some examples, the scheduling entity may receive a respective beam measurement report from each of the plurality of scheduled entities located within the coverage area of the scheduling entity. Each beam measurement report may indicate the respective set of candidate beams for that scheduled entity. For example, the candidate beam(s) may include the one or more reference beams with the highest received power or quality for that particular scheduled entity. In other examples, for reciprocal channels, the scheduling entity may identify the respective candidate beam sets from uplink measurements of uplink reference signals transmitted by the scheduled entities. For example, the UL traffic and control channel reception and processing circuitry 1244, together with the beam management circuitry 1241 shown and described above in connection with FIG. 12 may receive the beam measurement reports or measure the uplink reference signals to identify the respective sets of candidate beams for each of the scheduled entities.

At block 1306, the scheduling entity may identify a group of scheduled entities corresponding to a subset of the plurality of scheduled entities to receive group common control information. For example, the resource assignment and scheduling circuitry 1242 shown and described above in connection with FIG. 12 may identify the group of scheduled entities.

At block 1308, the scheduling entity may select a group of transmit beams from the respective sets of candidate beams of each of the scheduled entities within the group. In some examples, the group of transmit beams may include all of the candidate beams in each of the candidate beam sets of the scheduled entities in the group. In other examples, the group of transmit beams may include at least one candidate beam from each candidate beam set of the scheduled entities in the group. For example, the beam management circuitry 1241 shown and described above in connection with FIG. 12 may select the group of transmit beams for the group common control information.

At block 1310, the scheduling entity may transmit the group common control information to the scheduled entities in the group utilizing the group of transmit beams. For example, the scheduling entity may identify a respective spatial QCL relationship between each of the reference beams corresponding in direction to the transmit beams in the group and resources reserved for the group common control information. The scheduling entity may then transmit the group common control information based on the spatial QCL information to the group of scheduled entities utilizing the group of transmit beams in a partial beam-sweeping configuration (e.g., beam-sweeping across only the transmit beams within the group). Examples of group common control information may include, but are not limited to a pre-emption indication, a HARQ feedback resource indication, and/or a transmit power control (TPC) command for multiple UEs. For example, the DL traffic and control channel generation and transmission circuitry 1243, together with the beam management circuitry 1241 and the resource assignment and scheduling circuitry 1242, may transmit the group common control information to the group of scheduled entities.

Figure 14:
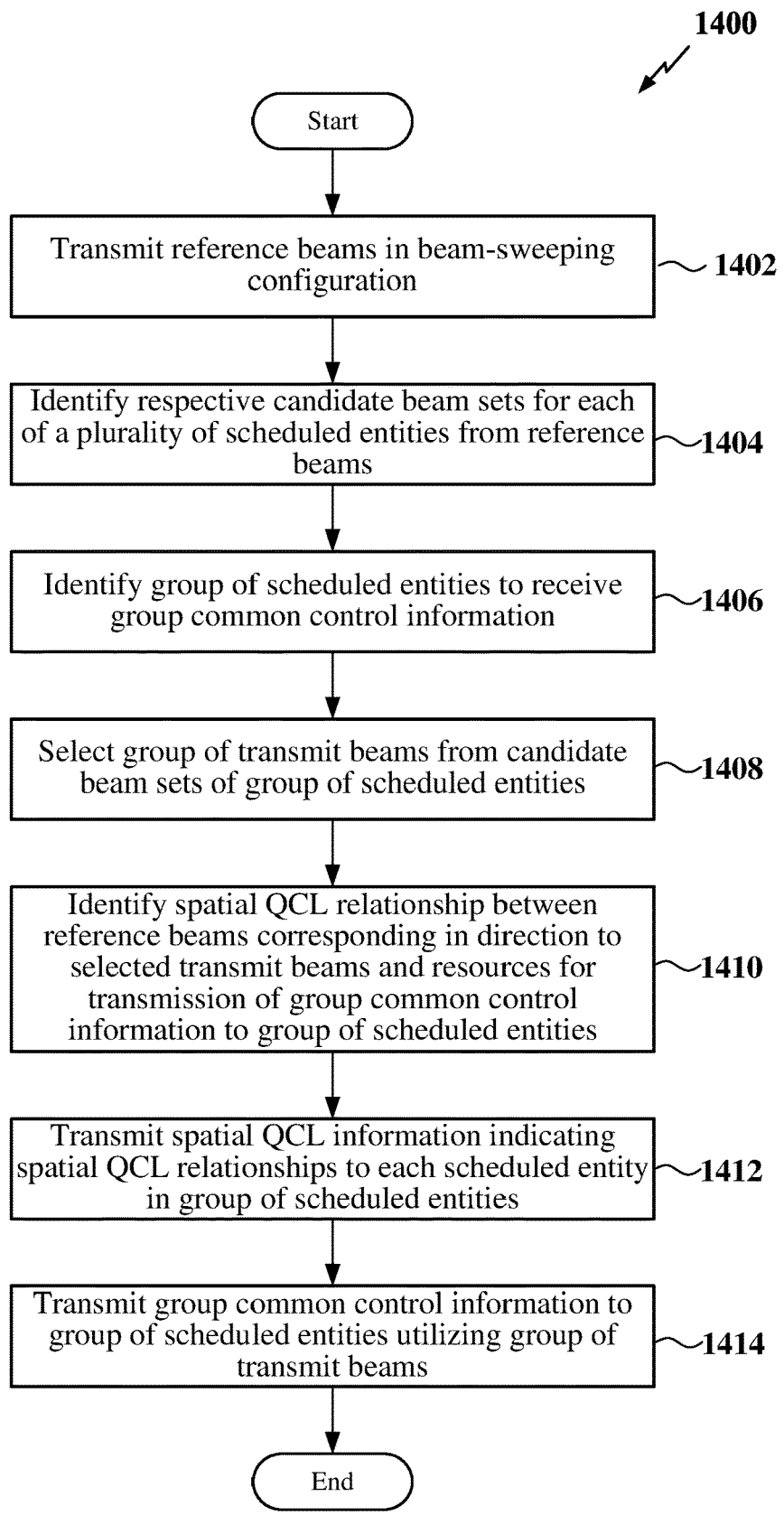
FIG. 14 is a flow chart illustrating another exemplary process operable at a scheduling entity for transmitting group common control information in a beam-sweeping configuration according to some aspects of the disclosure.

FIG. 14 is a flow chart illustrating a process 1400 for wireless communication of group common control information according to an aspect of the disclosure. As described below, some or all illustrated features may be omitted in a particular implementation within the scope of the present disclosure, and some illustrated features may not be required for implementation of all embodiments. In some examples, the process 1400 may be carried out by the scheduling entity illustrated in FIG. 12. In some examples, the process 1400 may be carried out by any suitable apparatus or means for carrying out the functions or algorithm described below.

At block 1402, the scheduling entity may transmit a plurality of reference beams in a beam-sweeping configuration throughout the coverage area (e.g., within a cell) of the scheduling entity. Each reference beam may include a reference signal, such as a synchronization signal (SS) or a channel state information reference signal (CSI-RS). For example, the DL traffic and control channel generation and transmission circuitry 1243, together with the beam management circuitry 1241, shown and described above in connection with FIG. 12 may transmit the reference beams.

At block 1404, for each of a plurality of scheduled entities, the scheduling entity may identify a respective set of one or more candidate beams from the reference beams on which a respective scheduled entity (UE) may receive information from the scheduling entity with high gain. In some examples, the scheduling entity may receive a respective beam measurement report from each of the plurality of scheduled entities located within the coverage area of the scheduling entity. Each beam measurement report may indicate the respective set of candidate beams for that scheduled entity. For example, the candidate beam(s) may include the one or more reference beams with the highest received power or quality for that particular scheduled entity. In other examples, for reciprocal channels, the scheduling entity may identify the respective candidate beam sets from uplink measurements of uplink reference signals transmitted by the scheduled entities. For example, the UL traffic and control channel reception and processing circuitry 1244, together with the beam management circuitry 1241 shown and described above in connection with FIG. 12 may receive the beam measurement reports or measure the uplink reference signals to identify the respective sets of candidate beams for each of the scheduled entities.

At block 1406, the scheduling entity may identify a group of scheduled entities corresponding to a subset of the plurality of scheduled entities to receive group common control information. For example, the resource assignment and scheduling circuitry 1242 shown and described above in connection with FIG. 12 may identify the group of scheduled entities.

At block 1408, the scheduling entity may select a group of transmit beams from the respective sets of candidate beams of each of the scheduled entities within the group. In some examples, the group of transmit beams may include all of the candidate beams in each of the candidate beam sets of the scheduled entities in the group. In other examples, the group of transmit beams may include at least one candidate beam from each candidate beam set of the scheduled entities in the group. For example, the beam management circuitry 1241 shown and described above in connection with FIG. 12 may select the group of transmit beams for the group common control information.

At block 1410, the scheduling entity may identify a respective spatial QCL relationship between each of the reference beams corresponding in direction to the transmit beams in the group and resources reserved for the group common control information. For example, the resource assignment and scheduling circuitry 1242 shown and described above in connection with FIG. 12 may identify the spatial QCL relationships for the group common control information.

At block 1412, the scheduling entity may transmit spatial QCL information indicating the respective spatial QCL relationships to the scheduled entities in the group via RRC or other type of signaling. In some examples, the scheduling entity may transmit respective spatial QCL information to each scheduled entity indicating the spatial QCL relationships associated with that scheduled entity. For example, the DL traffic and control channel generation and transmission circuitry 1244, together with the resource assignment and scheduling circuitry 1242, may transmit the spatial QCL information to the scheduled entities in the group.

At block 1414, the scheduling entity may transmit the group common control information to the scheduled entities in the group utilizing the group of transmit beams. The scheduling entity may transmit the group common control information within one or more PDCCHs (according to the resources indicated in the spatial QCL information) to the group of scheduled entities utilizing the group of transmit beams in a partial beam-sweeping configuration (e.g., beam-sweeping across only the transmit beams within the group). In examples where the group of transmit beams includes all of the beams (e.g., when there are a large number of UEs in the group and all beams are necessary for transmission to all of the UEs in the group), a full beam-sweeping across all of the beams may be performed. For example, the DL traffic and control channel generation and transmission circuitry 1244, together with the beam management circuitry 1241 and the resource assignment and scheduling circuitry 1242, may transmit the group common control information to the group of scheduled entities.

Figure 15:
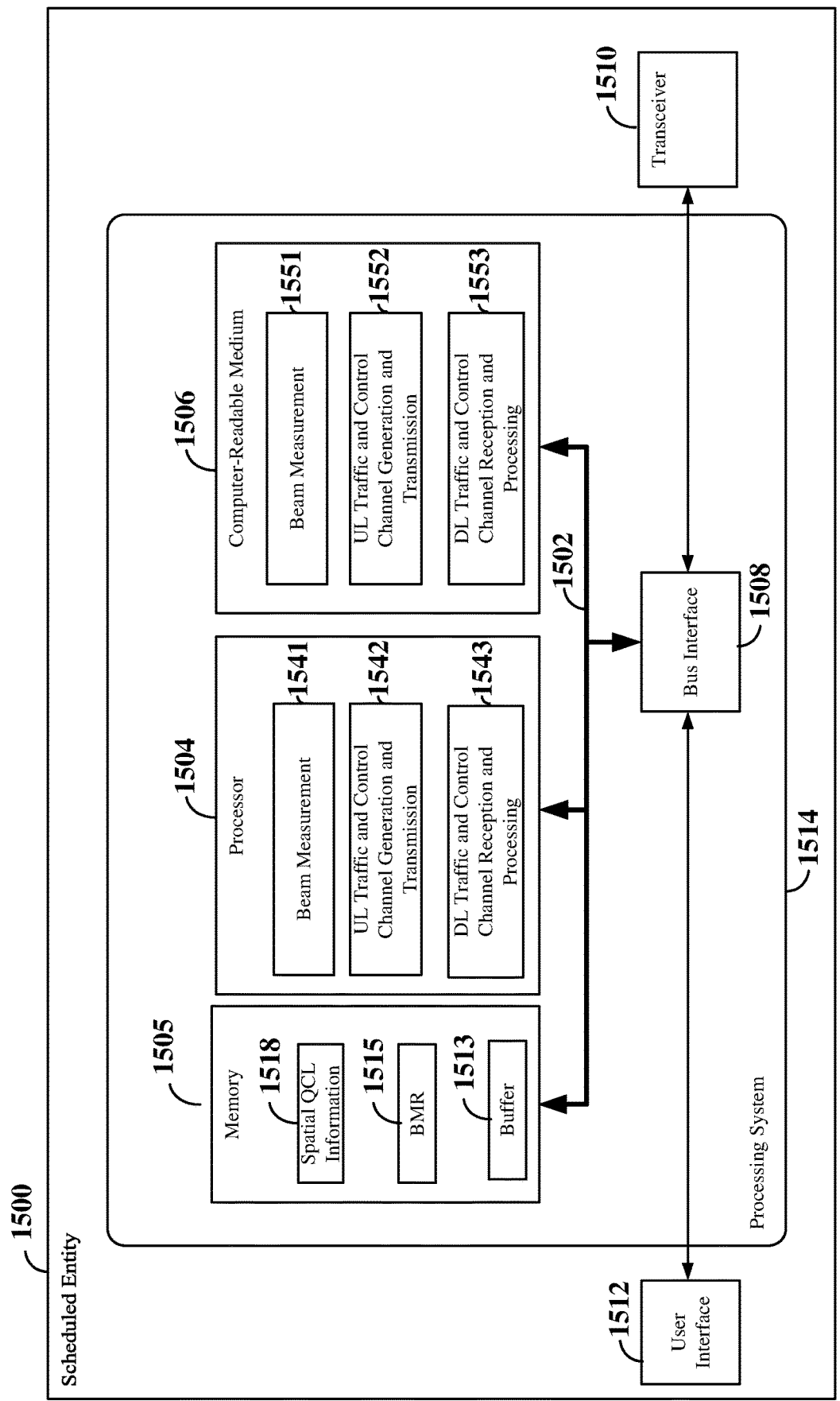
FIG. 15 is a block diagram illustrating an example of a hardware implementation for a scheduled entity employing a processing system according to some aspects of the disclosure.

FIG. 15 is a conceptual diagram illustrating an example of a hardware implementation for an exemplary scheduled entity 1500 employing a processing system 1514. In accordance with various aspects of the disclosure, an element, or any portion of an element, or any combination of elements may be implemented with a processing system 1514 that includes one or more processors 1504. For example, the scheduled entity 1500 may be a user equipment (UE) as illustrated in any one or more of the FIGs. disclosed herein.

The processing system 1514 may be substantially the same as the processing system 1214 illustrated in FIG. 12, including a bus interface 1508, a bus 1502, memory 1505, a processor 1504, and a computer-readable medium 1506. Furthermore, the scheduled entity 1500 may include a user interface 1512 and a transceiver 1510 substantially similar to those described above in FIG. 12. That is, the processor 1504, as utilized in a scheduled entity 1500, may be used to implement any one or more of the processes described below and illustrated in the various figures.

In some aspects of the disclosure, the processor 1504 may include beam measurement circuitry 1541, configured to receive a plurality of reference beams, each carrying a reference signal, such as a synchronization signal (SS) or a channel state information reference signal (CSI-RS), and to measure the respective received power or quality of each of the reference beams. The beam measurement circuitry 1541 may further be configured to generate a beam measurement report 1515 indicating a set of one or more candidate beams on which the scheduling entity may transmit information to the scheduled entity with high gain. The beam measurement report (BMR) 1515 may further be maintained, for example, in memory 1505. The beam measurement circuitry 1541 may further be configured to execute beam measurement software 1551 included on the computer-readable medium 1506 to implement one or more functions described above and/or described below in relation to FIG. 16.

The processor 1504 may further include uplink (UL) traffic and control channel generation and transmission circuitry 1542, configured to generate and transmit uplink control/feedback/acknowledgement information on an UL control channel. For example, the UL traffic and control channel generation and transmission circuitry 1542 may be configured to generate and transmit uplink user data traffic on an UL traffic channel (e.g., a PUSCH) in accordance with an uplink grant. In addition, the UL traffic and control channel generation and transmission circuitry 1542 may be configured to generate and transmit an uplink control channel (e.g., a Physical Uplink Control Channel (PUCCH)).

In some examples, the UL traffic and control channel generation and transmission circuitry 1542 may be configured to access the memory 1505 to retrieve the BMR 1515 and to transmit the BMR 1515 to the scheduling entity (e.g., base station, such as a gNB). In other examples, the UL traffic and control channel generation and transmission circuitry 1542 may generate and transmit one or more uplink reference signals, such as sounding reference signals (SRSs), from which the scheduling entity may derive the set of one or more candidate beams. The UL traffic and control channel generation and transmission circuitry 841 may further be configured to execute UL traffic and control channel generation and transmission software 1552 included on the computer-readable medium 1506 to implement one or more functions described above and/or described below in relation to FIG. 16.

The processor 1504 may further include downlink (DL) traffic and control channel reception and processing circuitry 1543, configured for receiving and processing downlink user data traffic on a traffic channel, and to receive and process control information on one or more downlink control channels. For example, the DL traffic and control channel reception and processing circuitry 1543 may be configured to receive a Physical Downlink Control Channel (PDCCH) and/or a Physical Downlink Shared Channel (PDSCH) within a slot. In some examples, received downlink user data traffic and/or control information may be temporarily stored in a data buffer 1513 within memory 1505.

In some examples, the DL traffic and control channel reception and processing circuitry 1543 may further be configured to receive a plurality of reference beams, each carrying a reference signal, and provide the reference signals to the beam measurement circuitry 1541 for measurement of the respective received power or quality of each of the reference beams. The DL traffic and control channel reception and processing circuitry 1543 may further receive spatial QCL information 1518 via RRC or other type of signaling indicating a spatial QCL relationship between at least one reference beam selected for the candidate beam set based on the BMR 1515 and resources reserved for broadcast information. The spatial QCL information 1518 may be maintained, for example, in memory 1505.

In various aspects of the disclosure, the spatial QCL information 1518 may further indicate a spatial QCL relationship between at least one reference beam selected from the candidate beam set and resources reserved for group common control information. The DL traffic and control channel reception and processing circuitry 1543 may then further be configured to receive downlink group common control information from the scheduling entity using at least one receive beam corresponding in direction to the at least one selected candidate beam and the corresponding resources indicated in the spatial QCL information 1518. Examples of group common control information may include, but are not limited to a pre-emption indication, a HARQ feedback resource indication, and/or a transmit power control (TPC) command for multiple UEs. The DL traffic and control channel reception and processing circuitry 1543 may be configured to execute DL traffic and control channel reception and processing software 1553 included on the computer-readable medium 1506 to implement one or more functions described above and/or described below in relation to FIG. 16.

Figure 16:
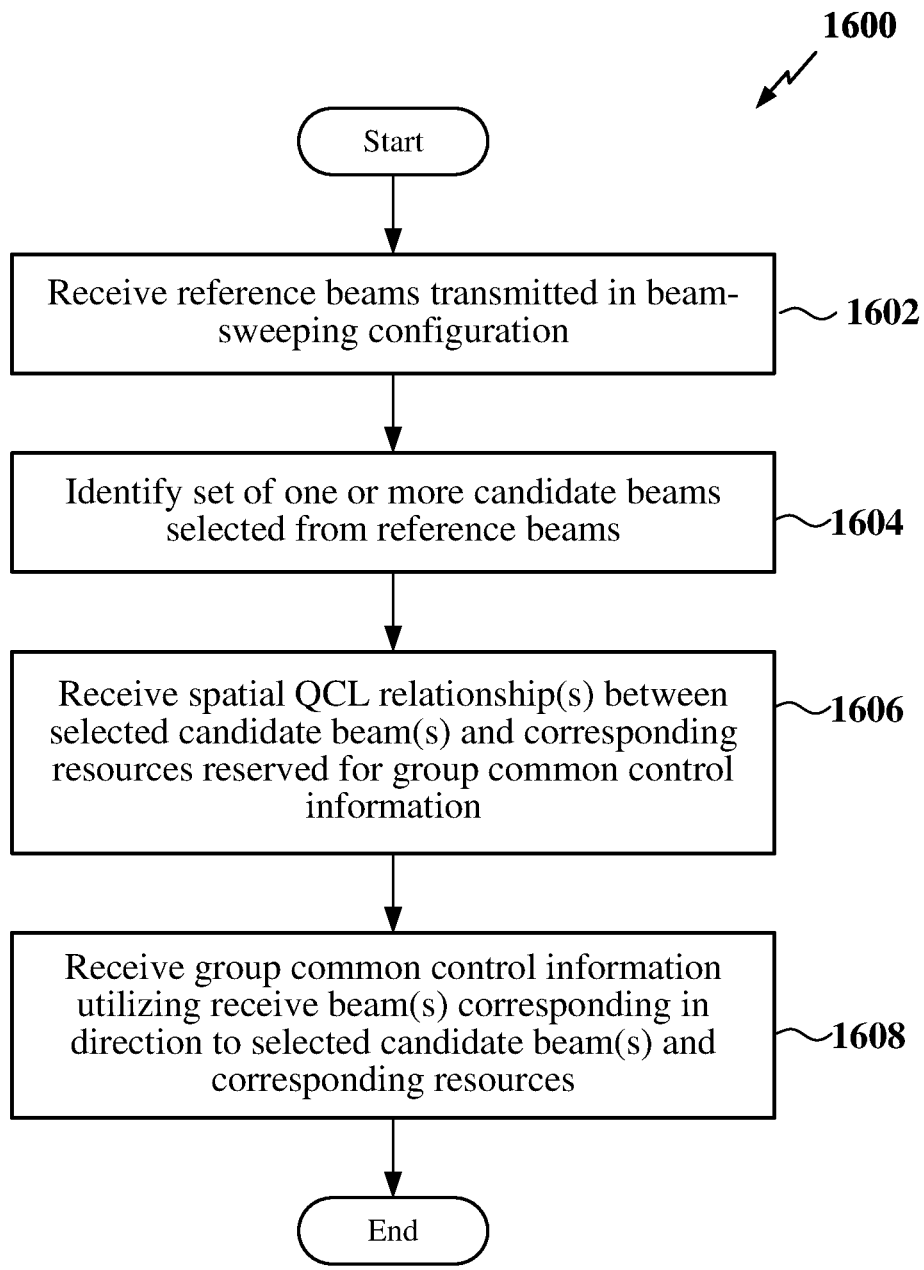
FIG. 16 is a flow chart illustrating an exemplary process operable at a scheduled entity for receiving group common control information broadcast in a beam-sweeping configuration according to some aspects of the disclosure.

FIG. 16 is a flow chart illustrating a process 1600 for wireless communication of group common control information according to an aspect of the disclosure. As described below, some or all illustrated features may be omitted in a particular implementation within the scope of the present disclosure, and some illustrated features may not be required for implementation of all embodiments. In some examples, the process 1600 may be carried out by the scheduled entity illustrated in FIG. 15. In some examples, the process 1600 may be carried out by any suitable apparatus or means for carrying out the functions or algorithm described below.

At block 1602, the scheduled entity may receive a plurality of reference beams transmitted in a beam-sweeping configuration throughout the coverage area (e.g., within a cell) of a scheduling entity. Each reference beam may include a reference signal, such as a synchronization signal (SS) or a channel state information reference signal (CSI-RS). For example, the DL traffic and control channel reception and processing circuitry 1543 shown and described above in connection with FIG. 15 may receive the reference beams At block 1604, the scheduled entity may identify a set of one or more candidate beams selected from the reference beams on which the scheduled entity may receive information from the scheduling entity with high gain. For example, the candidate beam(s) may include the one or more reference beams with the highest received power or quality measured by the scheduled entity. In some examples, the scheduled entity may determine the set of one or more candidate beams from the reference beams. The scheduled entity may further generate a beam measurement report indicating the set of one or more candidate beams and transmit the beam measurement report to the scheduling entity. For example, the DL traffic and control channel reception and processing circuitry 1543, together with the beam measurement circuitry 1541 and UL traffic and control channel generation and transmission circuitry 1542, shown and described above in connection with FIG. 15 may measure the respective received power or quality of each of the reference beams, identify the set of candidate beams from the measured power/quality of the reference beams, and generate the beam measurement report.

At block 1606, the scheduled entity may receive a respective spatial QCL relationship between each selected candidate beam in the candidate beam set and corresponding resources reserved for group common control information to be transmitted from the scheduling entity to a group of scheduled entities including the scheduled entity. In some examples, the spatial QCL relationships may be received via RRC or other type of signaling. For example, the DL traffic and control channel reception and processing circuitry 1543 may receive spatial QCL information including the spatial QCL relationship(s).

At block 1608, the scheduled entity may then receive the group common control information within one or more PDCCHs (according to the resources indicated in the spatial QCL information) utilizing at least one receive beam, each corresponding in direction to one of the candidate beams selected for the group common control information. For example, the scheduled entity may monitor the indicated PDCCH resources for the group common control information using the at least one receive beam. Examples of group common control information may include, but are not limited to a pre-emption indication, a HARQ feedback resource indication, and/or a transmit power control (TPC) command for multiple UEs. For example, the DL traffic and control channel reception and processing circuitry 1543 may receive the group common control information.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 5, 7-9, 11, 12, and 15 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communications at a scheduling entity, comprising:
   transmitting a plurality of reference beams, each comprising a reference signal, in a beam-sweeping configuration;
   for each of a plurality of scheduled entities, identifying a respective set of candidate beams on which a respective scheduled entity of the plurality of scheduled entities can receive information from the scheduling entity, wherein each of the candidate beams corresponds to one of the plurality of reference beams;
   identifying a group of scheduled entities comprising a subset of the plurality of scheduled entities;
   selecting a group of transmit beams from the respective sets of candidate beams of each of the scheduled entities within the group of scheduled entities; and
   transmitting group common control information to the group of scheduled entities utilizing the group of transmit beams.

2. The method of claim 1, further comprising:
   receiving a respective beam measurement report from each of the plurality of scheduled entities, each of the beam measurement reports indicating the respective set of candidate beams.

3. The method of claim 1, wherein the group of transmit beams comprises at least one selected candidate beam from each of the sets of candidate beams provided by the group of scheduled entities.

4. The method of claim 1, wherein the group of transmit beams comprises less than all of the plurality of reference beams.

5. The method of claim 1, wherein transmitting the group common control information to the group of scheduled entities utilizing the group of transmit beams further comprises:
   identifying a spatial quasi-colocation (QCL) relationship between corresponding ones of the plurality of reference beams corresponding in direction to the group of transmit beams and resources reserved for the group common control information.

6. The method of claim 5, wherein the group of transmit beams comprises at least one selected transmit beam for a scheduled entity within the group of scheduled entities, and further comprising:

transmitting spatial QCL information comprising the spatial QCL relationship between at least one corresponding one of the plurality of reference beams corresponding to the at least one selected transmit beam and corresponding ones of the resources reserved for the group common control information to the scheduled entity via radio resource control (RRC) signaling, medium access control-control element (MAC-CE) signaling, or downlink control information (DCI)-based signaling.

7. The method of claim 1, wherein transmitting the group common control information to the group of scheduled entities utilizing the group of transmit beams further comprises:

transmitting the group common control information within one or more physical downlink control channels to the group of scheduled entities utilizing the group of transmit beams in an additional beam-sweeping configuration.

8. The method of claim 1, wherein the group common control information comprises at least one of a pre-emption indication, a hybrid automatic receive request (HARQ) feedback resource indication, or a transmit power control (TPC) command.

9. An apparatus for wireless communication, comprising:
    a processor;
    a transceiver communicatively coupled to the processor; and
    a memory communicatively coupled to the processor, wherein the processor is configured to:
        transmit a plurality of reference beams, each comprising a reference signal, in a beam-sweeping configuration;
        for each of a plurality of scheduled entities, identify a respective set of candidate beams on which a respective scheduled entity of the plurality of scheduled entities can receive information from the scheduling entity, wherein each of the candidate beams corresponds to one of the plurality of reference beams;
        identify a group of scheduled entities comprising a subset of the plurality of scheduled entities;
        select a group of transmit beams from the respective sets of candidate beams of each of the scheduled entities within the group of scheduled entities; and
        transmit group common control information to the group of scheduled entities utilizing the group of transmit beams.

10. The apparatus of claim 9, wherein the processor is further configured to:

receive a respective beam measurement report from each of the plurality of scheduled entities, each of the beam measurement reports indicating the respective set of candidate beams.

11. The apparatus of claim 9, wherein the group of transmit beams comprises at least one selected candidate beam from each of the sets of candidate beams provided by the group of scheduled entities.

12. The apparatus of claim 9, wherein the group of transmit beams comprises less than all of the plurality of reference beams.

13. The apparatus of claim 9, wherein the processor is further configured to:

identify a spatial quasi-colocation (QCL) relationship between corresponding ones of the plurality of reference beams corresponding in direction to the group of transmit beams and resources reserved for the group common control information.

14. The apparatus of claim 13, wherein the group of transmit beams comprises at least one selected transmit beam for a scheduled entity within the group of scheduled entities, and wherein the processor is further configured to:

transmit spatial QCL information comprising the spatial QCL relationship between at least one corresponding one of the plurality of reference beams corresponding to the at least one selected transmit beam and corresponding ones of the resources reserved for the group common control information to the scheduled entity via radio resource control (RRC) signaling, medium access control-control element (MAC-CE) signaling, or downlink control information (DCI)-based signaling.

15. The apparatus of claim 9, wherein the processor is further configured to:

transmit the group common control information within one or more physical downlink control channels to the group of scheduled entities utilizing the group of transmit beams in an additional beam-sweeping configuration.

16. The apparatus of claim 9, wherein the group common control information comprises at least one of a pre-emption indication, a hybrid automatic receive request (HARQ) feedback resource indication, or a transmit power control (TPC) command.

17. A method of wireless communications at a scheduled entity, comprising:

receiving a plurality of reference beams, each comprising a reference signal, transmitted by a scheduling entity in a beam-sweeping configuration;
    identifying a set of candidate beams on which the scheduled entity can receive information from the scheduling entity, wherein each of the candidate beams corresponds to one of the plurality of reference beams;
    receiving spatial quasi-colocation (QCL) information comprising a spatial QCL relationship between at least one selected candidate beam within the set of candidate beams and corresponding resources reserved for group common control information to be transmitted by the scheduling entity to a plurality of scheduled entities comprising the scheduled entity; and
    receiving the group common control information utilizing at least one receive beam corresponding in direction to the at least one selected candidate beam and the corresponding resources.

18. The method of claim 17, further comprising:
    generating a beam measurement report indicating the set of candidate beams; and
    transmitting the beam measurement report to the scheduling entity.

19. The method of claim 17, wherein the set of candidate beams comprises less than all of the plurality of reference beams.

20. The method of claim 17, wherein receiving the spatial QCL information comprising the spatial QCL relationship between the at least one selected candidate beam within the set of candidate beams and the corresponding resources reserved for the group common control information further comprises:

receiving the spatial QCL information comprising the spatial QCL relationship between the at least one selected candidate beam within the set of candidate beams and the corresponding resources reserved for the group common control information via radio resource control (RRC) signaling, medium access control-control element (MAC-CE) signaling, or downlink control information (DCI)-based signaling.

21. The method of claim 17, wherein the corresponding resources comprise physical downlink control channel resources.

22. The method of claim 21, wherein receiving the group common control information utilizing at least one receive beam corresponding in direction to the at least one selected candidate beam and the corresponding resources further comprises:
monitoring the physical downlink control channel resources for the group common control information using the at least one receive beam.

23. The method of claim 17, wherein the group common control information comprises at least one of a pre-emption indication, a hybrid automatic receive request (HARQ) feedback resource indication, or a transmit power control (TPC) command.

24. An apparatus for wireless communication, comprising:
a processor;
a transceiver communicatively coupled to the processor; and
a memory communicatively coupled to the processor, wherein the processor is configured to:
receive a plurality of reference beams via the transceiver, each comprising a reference signal, transmitted by a scheduling entity in a beam-sweeping configuration;
identify a set of candidate beams on which the scheduled entity can receive information from the scheduling entity, wherein each of the candidate beams corresponds to one of the plurality of reference beams;
receive spatial quasi-colocation (QCL) information comprising a spatial QCL relationship between at least one selected candidate beam within the set of candidate beams and corresponding resources reserved for group common control information to be transmitted by the scheduling entity to a plurality of scheduled entities comprising the scheduled entity; and
receive the group common control information utilizing at least one receive beam corresponding in direction to the at least one selected candidate beam and the corresponding resources.

25. The apparatus of claim 24, wherein the processor is further configured to:
generate a beam measurement report indicating the set of candidate beams; and
transmit the beam measurement report to the scheduling entity.

26. The apparatus of claim 24, wherein the set of candidate beams comprises less than all of the plurality of reference beams.

27. The apparatus of claim 24, wherein the processor is further configured to:
receive the spatial QCL information comprising the spatial QCL relationship between the at least one selected candidate beam within the set of candidate beams and the corresponding resources reserved for the group common control information via radio resource control (RRC) signaling, medium access control-control element (MAC-CE) signaling, or downlink control information (DCI)-based signaling.

28. The apparatus of claim 24, wherein the corresponding resources comprise physical downlink control channel resources.

29. The apparatus of claim 28, wherein the processor is further configured to:
monitor the physical downlink control channel resources for the group common control information using the at least one receive beam.

30. The apparatus of claim 24, wherein the group common control information comprises at least one of a pre-emption indication, a hybrid automatic receive request (HARQ) feedback resource indication, or a transmit power control (TPC) command.

* * * * *